United States Patent [19]

Hill et al.

[11] Patent Number: 5,796,944
[45] Date of Patent: Aug. 18, 1998

[54] APPARATUS AND METHOD FOR PROCESSING DATA FRAMES IN AN INTERNETWORKING DEVICE

[75] Inventors: Shannon Q. Hill, Westford; Christopher P. Lawler, Wellesley, both of Mass.

[73] Assignee: 3Com Corporation, Santa Clara, Calif.

[21] Appl. No.: 501,500

[22] Filed: Jul. 12, 1995

[51] Int. Cl.$^6$ .................................................. G06F 13/00
[52] U.S. Cl. ............................ 395/200.8; 395/800.26; 395/800.29; 395/800.27; 395/800.34; 364/DIG. 1
[58] Field of Search .......................... 395/800, 200.07, 395/200.15, 800.01, 200.01, 200.08, 800.26, 800.29, 800.27, 800.34; 364/DIG. 1

[56] References Cited

U.S. PATENT DOCUMENTS

| | | | |
|---|---|---|---|
| 4,455,602 | 6/1984 | Baxter, III et al. | 364/200 |
| 4,488,004 | 12/1984 | Bogart et al. | 179/18 AD |
| 4,525,780 | 6/1985 | Bratt et al. | 364/200 |
| 4,562,436 | 12/1985 | Coleman et al. | 340/825 |
| 4,578,796 | 3/1986 | Charalambous et al. | 375/8 |
| 4,587,651 | 5/1986 | Nelson et al. | 370/88 |
| 4,597,077 | 6/1986 | Nelson et al. | 370/88 |
| 4,645,874 | 2/1987 | Fildes | 379/93 |
| 4,663,748 | 5/1987 | Karbowiak et al. | 370/89 |
| 4,679,191 | 7/1987 | Nelson et al. | 370/84 |
| 4,713,806 | 12/1987 | Oberlander et al. | 370/58 |
| 4,720,850 | 1/1988 | Oberlander et al. | 379/90 |
| 4,748,618 | 5/1988 | Brown et al. | 370/94 |
| 4,750,114 | 6/1988 | Hirtle | 364/200 |
| 4,768,149 | 8/1988 | Konopik et al. | 364/200 |
| 4,831,620 | 5/1989 | Conway et al. | 370/85 |
| 4,835,674 | 5/1989 | Collins et al. | 364/200 |
| 4,843,606 | 6/1989 | Bux et al. | 370/89 |
| 4,872,158 | 10/1989 | Richards | 370/58.1 |
| 4,872,159 | 10/1989 | Hemmady et al. | 370/60 |
| 4,872,160 | 10/1989 | Hemmady et al. | 370/60 |
| 4,875,206 | 10/1989 | Nichols et al. | 370/85.15 |
| 4,893,302 | 1/1990 | Hemmady et al. | 370/60 |
| 4,894,824 | 1/1990 | Hemmady et al. | 370/58.3 |
| 4,899,333 | 2/1990 | Roediger | 370/60 |
| 4,912,656 | 3/1990 | Cain et al. | 364/514 |
| 4,922,486 | 5/1990 | Lidinsky et al. | 370/60 |
| 4,933,846 | 6/1990 | Humphrey et al. | 364/200 |
| 4,933,938 | 6/1990 | Sheehy | 370/86 |
| 4,939,728 | 7/1990 | Markkula, Jr. et al. | 370/94.3 |
| 4,947,390 | 8/1990 | Sheehy | 370/85.13 |
| 4,954,951 | 9/1990 | Hyatt | 364/200 |
| 4,955,018 | 9/1990 | Twitty et al. | 370/85.1 |
| 4,958,341 | 9/1990 | Hemmady et al. | 370/60.1 |

(List continued on next page.)

*Primary Examiner*—Alyssa H. Bowler
*Assistant Examiner*—Dzung C. Nguyen
*Attorney, Agent, or Firm*—Weingarten, Schurgin, Gagnebin & Hayes LLP

[57] ABSTRACT

An address management circuit and method of operation, for use in a communications internetworking device, includes a search engine having first and second search circuits for concurrently searching a network address table for source and destination addresses of a frame received by the communications internetworking device. Memory read cycles of the source and destination address searches are interleaved to allow a memory access to occur during every system cycle to thereby rapidly complete the searches for both the source and destination addresses.

22 Claims, 16 Drawing Sheets

U.S. PATENT DOCUMENTS

| | | | |
|---|---|---|---|
| 5,021,949 | 6/1991 | Morton et al. | 364/200 |
| 5,042,000 | 8/1991 | Baldwin | 364/726 |
| 5,048,014 | 9/1991 | Fischer | 370/85.5 |
| 5,095,480 | 3/1992 | Fenner | 370/94.1 |
| 5,101,402 | 3/1992 | Chiu et al. | 370/17 |
| 5,113,522 | 5/1992 | Dinwiddie, Jr. et al. | 395/700 |
| 5,123,029 | 6/1992 | Bantz et al. | 375/1 |
| 5,127,104 | 6/1992 | Dennis | 395/650 |
| 5,144,692 | 9/1992 | Baker et al. | 395/425 |
| 5,155,809 | 10/1992 | Baker et al. | 395/200 |
| 5,163,138 | 11/1992 | Thirumalai | 395/325 |
| 5,185,877 | 2/1993 | Bissett et al. | 395/425 |
| 5,200,954 | 4/1993 | Teel, Jr. et al. | 370/94.1 |
| 5,210,748 | 5/1993 | Onishi et al. | 370/85.13 |
| 5,235,595 | 8/1993 | O'Dowd | 370/94.1 |
| 5,251,205 | 10/1993 | Callon et al. | 370/60 |
| 5,265,207 | 11/1993 | Zak et al. | 395/200 |
| 5,280,474 | 1/1994 | Nickolls et al. | 370/60 |
| 5,282,199 | 1/1994 | Hertzberg et al. | 370/85.14 |
| 5,283,868 | 2/1994 | Baker et al. | 395/200 |
| 5,291,444 | 3/1994 | Scott et al. | 365/189.05 |
| 5,299,193 | 3/1994 | Szczepanek | 370/85.1 |
| 5,301,303 | 4/1994 | Abraham et al. | 395/500 |
| 5,305,280 | 4/1994 | Hayano | 365/230.03 |
| 5,305,317 | 4/1994 | Szczepanek | 370/85.5 |
| 5,307,345 | 4/1994 | Lozowick et al. | 370/61 |
| 5,309,432 | 5/1994 | Kanakia | 370/60 |
| 5,317,568 | 5/1994 | Bixby et al. | 370/85.6 |
| 5,321,819 | 6/1994 | Szczepanek | 395/325 |
| 5,321,843 | 6/1994 | Shoji et al. | 395/800 |
| 5,325,356 | 6/1994 | Lyles | 370/60 |
| 5,327,421 | 7/1994 | Hiller et al. | 370/60.1 |
| 5,327,428 | 7/1994 | Van As et al. | 370/94.2 |
| 5,329,630 | 7/1994 | Baldwin | 395/425 |
| 5,331,191 | 7/1994 | Sugiura et al. | 257/336 |
| 5,331,315 | 7/1994 | Crosetto | 340/825.02 |
| 5,331,634 | 7/1994 | Fischer | 370/85.13 |
| 5,333,268 | 7/1994 | Douglas et al. | 395/200 |
| 5,343,471 | 8/1994 | Cassagnol | 370/85.13 |
| 5,355,365 | 10/1994 | Bhat et al. | 370/85.13 |
| 5,355,453 | 10/1994 | Row et al. | 395/200 |
| 5,485,455 | 1/1996 | Dobbins et al. | 370/60 |
| 5,602,995 | 2/1997 | Hendel et al. | 395/250 |
| 5,649,149 | 7/1997 | Stormon et al. | 395/435 |

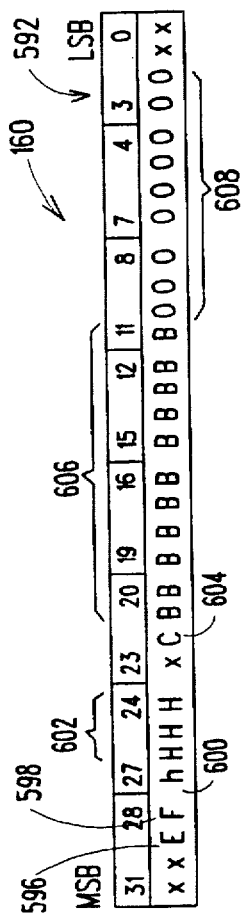
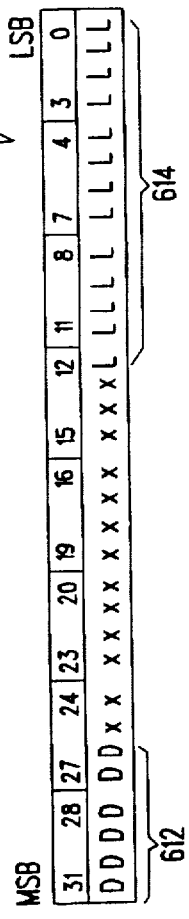
FIG. 14a
FIG. 14b

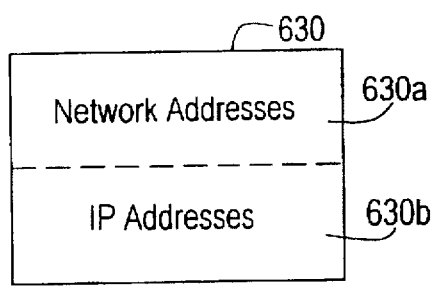
FIG. 18a
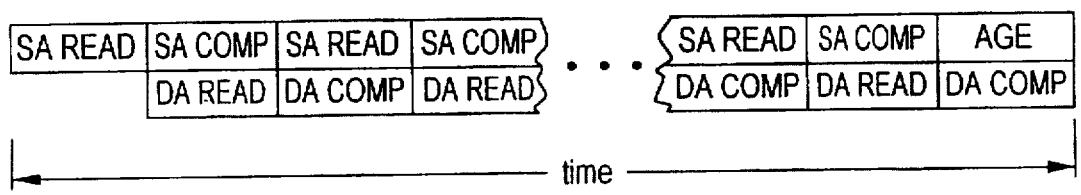
FIG. 19
FIG. 20
FIG. 21

APPARATUS AND METHOD FOR PROCESSING DATA FRAMES IN AN INTERNETWORKING DEVICE

FIELD OF THE INVENTION

This invention relates to computer communications networks and more particularly to internetworking devices used in such networks.

BACKGROUND OF THE INVENTION

Computer communication networks include a plurality of computers which are interconnected to permit communicating among the connected computers. Data is exchanged between the respective computers in an orderly and accurate manner by using a well defined set of rules and data structures generally referred to as a medium access control protocol. A medium access control protocol defines, among other things, the form that the data must have to be transferred across the network; how each node is addressed; and how each node will be given access to the communication channel. Different communication networks may use different medium access control protocols.

As is also known, networks using different medium access control protocols cannot directly communicate with one another without some form of translation apparatus coupled between the different networks. Thus, to permit computers on two networks having different medium access control protocols to communicate, a device generally referred to as an internetworking device is used. Illustrative internetworking devices include bridges and routers.

For example, an internetworking device may be used to couple a Fiber Distributed Data Interface (FDDI) network to an Ethernet network. The internetworking device may also be used to connect networks using the same medium access control protocol.

The internetworking device receives data which may be in the form of a data packet and determines whether a destination address located in the data packet indicates that the data should be transferred to any of the networks coupled thereto. If the internetworking device so determines, the device provides the medium access control protocol conversion necessary to allow the two networks to communicate.

Internetworking devices typically include a network address table containing a list of addresses corresponding to nodes which are coupled to each of the different networks. If a data packet received by the internetworking device contains an address which is not stored in the network address table, then the internetworking device transmits the data packet to all of the networks connected thereto. Unless most of the nodes on each of the networks to which the internetworking device is attached are included in the network address table, each network is flooded with data packets which are not actually intended for that particular network. This results in a waste of system bandwidth and resources.

Often, the limiting factor of the performance of the translation apparatus is the speed at which network source and destination addresses can be located within a network address table.

It would be desirable, therefore, to provide an internetworking device which can efficiently process frames provided thereto and rapidly determine whether source and destination addresses associated with such frames are stored in a network address table.

SUMMARY OF THE INVENTION

An address management apparatus is presently described for use in a communications internetworking device. The apparatus includes an input interface circuit for receiving source and destination addresses, a search engine having a pair of search circuits coupled to the input interface, a network processor unit coupled to the search engine and an output interface circuit coupled to the search engine. With this particular arrangement an address management circuit for concurrently searching for source and destination addresses in a memory is provided. By performing concurrent searches of the memory, it may be rapidly determined whether the source and destination addresses are present in a network address table stored in the memory. A first one of the pair of search circuits receives a source address provided from a buffer management circuit of an internetworking device and an address retrieved from the network address table. A second one of the pair of search circuits receives a destination address provided from the buffer management circuit and a second address retrieved from the network address table. The first and second search circuits respectively compare the source and destination addresses to the addresses retrieved from memory and provide an indication of whether the source and destination addresses are located in the network address table stored in the memory. By providing a source address to the first search circuit and a destination address to the second search circuit, the search for the source and destination addresses can be conducted concurrently. In one embodiment, the search circuits perform the searches using a binary search technique. The network processor unit coupled to the search engine provides an indicator to the search engine to indicate the position of a last address stored in the memory.

Also described is a communications internetworking device which includes a buffer management circuit for receiving frames from a network, a memory for storing a plurality of network addresses and an address management circuit, coupled to the buffer management circuit and the memory, wherein the buffer management circuit processes the frames and provides source and destination addresses to the address management circuit. The communications internetworking device further includes first and second bounds registers for partitioning the memory into a plurality of memory regions. Each of the memory regions has stored therein a network address table. Upon receipt of a source and destination address from the buffer management circuit, the address management circuit searches a particular one of the network address tables to determine if either of the source or destination addresses are stored in the particular table. The different network address tables may thus be used to support different functions, for example routing and bridging functions, within the communication internetworking device.

Also disclosed is a method for locating source and destination addresses in a network address table by retrieving a first address from a network address table, comparing a particular source address with the first address retrieved from the network address table and retrieving a second address from the network address table wherein the step of comparing the particular source address with the first address retrieved from the network address table and the step of retrieving the second address from the network address table are performed concurrently. With this particular technique source and destination addresses may be rapidly located in a network table. By interleaving source and destination address memory read operations, a memory access can be performed during every clock cycle of the internetworking device. Furthermore. if the source address is found prior to the destination address or vice-versa. then memory input/output operations can be performed during those clock cycles during which source address or destination address read operations would otherwise occur during the search operation.

BRIEF DESCRIPTION OF THE DRAWINGS

The foregoing features of this invention as well as the invention itself may be more fully understood from the following detailed description of the drawings in which:

FIG. 6 is illustrative of the format of data stored in the buffer memory of FIG. 4a;

FIGS. 14a and 14b show an illustrative data format for a Transmit Queue entry in a Transmit Queue;

FIG. 18a is a diagrammatical representation of a partitioned network address table;

FIG. 19 is a diagrammatical representation of operations performed during timing cycles of the address management circuit;

FIG. 20 is a diagrammatical representation of operations performed during timing cycles of the address management circuit; and FIG. 21 is a diagrammatical representation of operations performed during timing cycles of the address management circuit.

DESCRIPTION OF THE PREFERRED EMBODIMENTS

Figure 1:
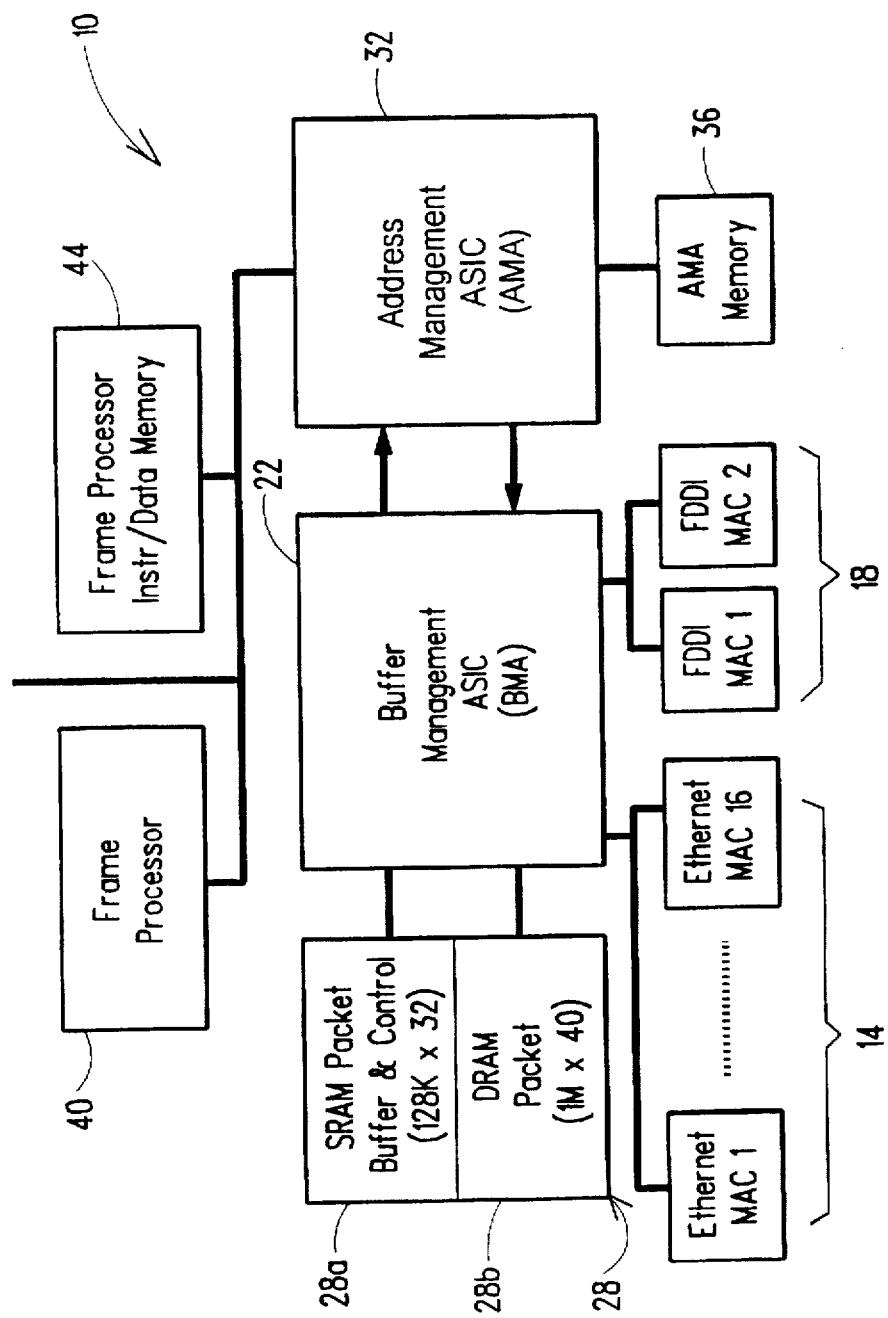
FIG. 1 is a block diagram of an embodiment of an internetworking device in accordance with the invention.

In brief overview and referring to FIG. 1. the presently disclosed internetworking device 10 includes a plurality of Ethernet Media Access Controllers (MACs) 14 (in one embodiment a total of sixteen) and one or more FDDI MACs 18 (in one embodiment a total of two). Each of the MACs provides a port for reception and transmission of data packets (frames) from/to the respective Ethernet or FDDI network (not shown). The network from which a data packet is received is referred to as a source network and the network to which a data packet is transmitted is referred to as a destination network. More specifically. the node attached to a network from which a packet is received is referred to as a source node and the node to which a packet is transmitted is designated as a destination node. A data packet received from a source network by a MAC 14. 18 is stored in a buffer memory 28 under the control of a Buffer Management ASIC (BMA) 22 as described hereinafter. Illustrative internetworking devices 10 are bridges. or switches. which control packet communication based on data link layer information. and routers which control packet communication based on network layer information.

Figure 2:
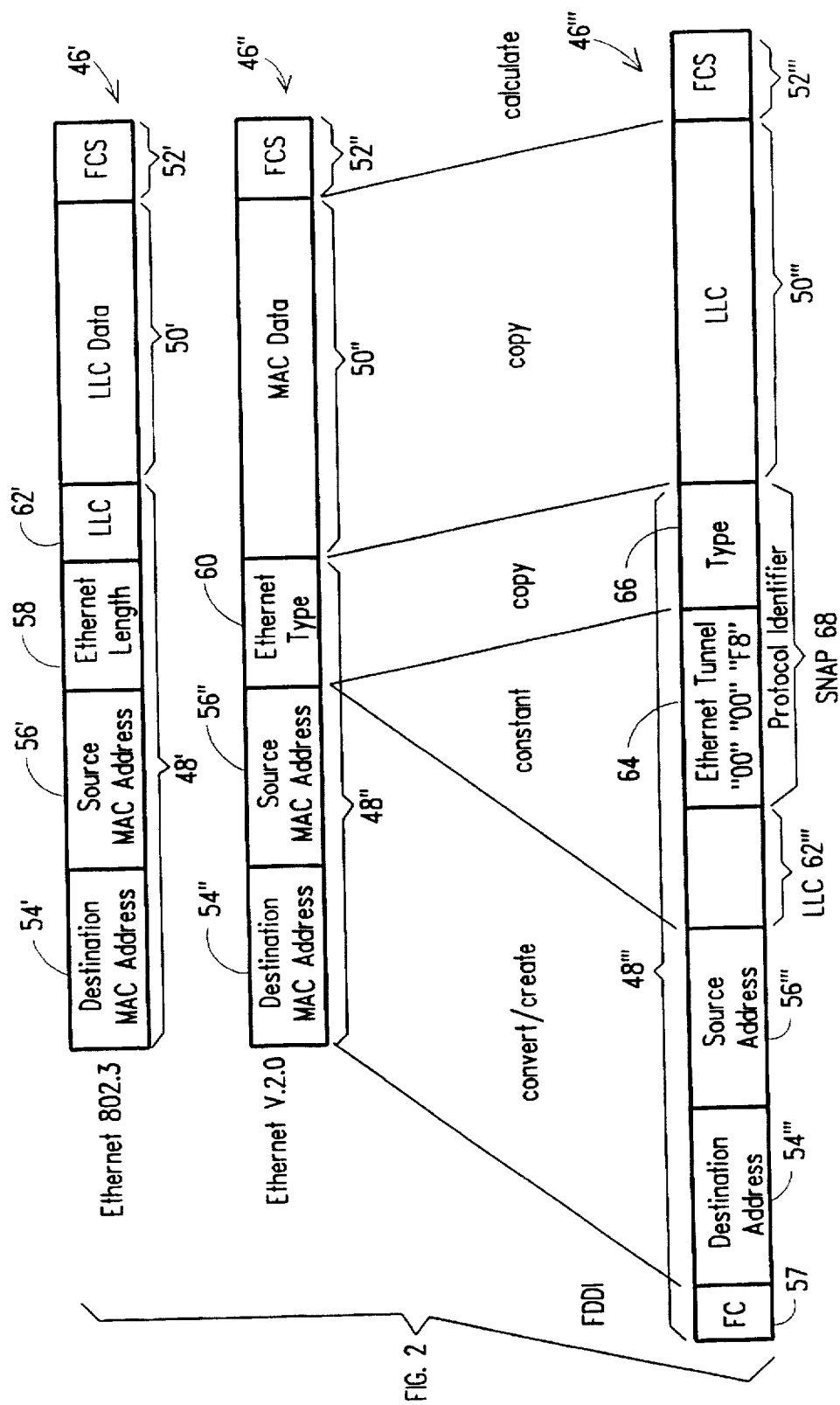
FIG. 2 shows the frame formats associated with Ethernet version 2.0. Ethernet 802.3. and FDDI networks.

Referring also to FIG. 2. the format of data packets (referred to hereinafter generally as 46) associated with an Ethernet 802.3 network (46'). an Ethernet version 2.0 network (46") and an FDDI network (46'"). respectively. is shown. Each of the data packets 46 includes a header portion. or packet header (referred to generally as 48). a data portion (referred to generally as 50). and a trailer portion (referred to generally as 52). More particularly. the Ethernet 802.3 packet 46' has a header 48'. data 50' and a trailer 52'. the Ethernet version 2.0 packet 46" has a header 48". data 50" and a trailer 52". and the FDDI packet 46'" has a header 48'". data 50'" and a trailer 52'".

The header portion 48 of each of the data packets 46 includes a destination node address (referred to hereinafter generally as 54) and a source node address (referred to hereinafter generally as 56). The packet headers 48 further include network specific information. Specifically. the Ethernet 802.3 packet header 48' additionally includes a length field 58 and an LLC field 62'. The Ethernet version 2.0 packet header 48" additionally includes a type field 60. And the FDDI packet header 48'" additionally includes a frame control entry 57. preceding the destination address 54'". an LLC field 62'". an Ethernet tunnel field 64 and a type field 66. following the source address 56". The FDDI tunnel field 64 and type field 56 are only present in certain instances and are referred to collectively as a SNAP portion 68.

The data portion 50 of the respective frames contains the information to be transferred between the networks. In the case of the Ethernet 802.3 packet 46'. the data field 50' sometimes includes an LLC field 72. The trailer 52 typically includes an error detection field. such as a Cyclic Redundancy Check (CRC) or Frame Check Sequence (FCS).

The BMA 22 sends the source address 56 and the destination address 54 of the packet 46. as well as other information. to an Address Management ASIC (AMA) 32 and causes the entire data packet 46 to be stored in one or more packet buffers. located in memory 28. The portion of buffer memory 28 used to store the respective packet is associated with the respective MAC 14. 18 receiving the data packet as hereinafter described.

Figure 6:
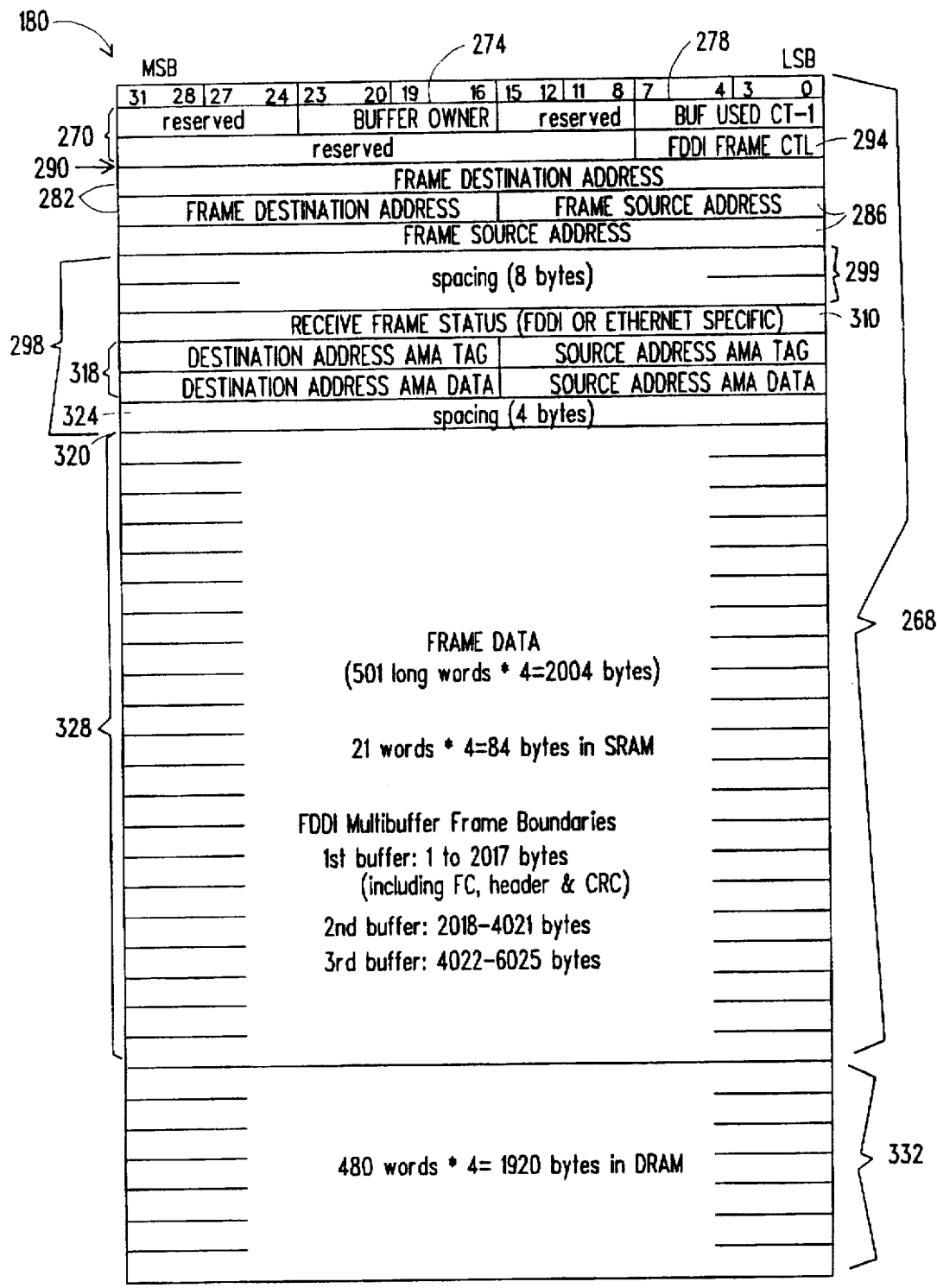

The first 96 bytes of a received Ethernet packet (or the first 97 bytes of a received FDDI packet) are stored in an SRAM portion 28a of memory 28 and any remaining bytes of the received packet are stored in a DRAM portion 28b of memory 28. After a predetermined number of bytes (which include the destination and source addresses) have been stored in SRAM 28a, a gap is "inserted" in the buffer memory 28 between the source address 56 and the remainder of the packet (as shown in FIG. 6 and described in detail below). That is, after the destination and source addresses are stored sequentially, the remaining portion of the received packet is stored beginning at a memory location separated from the last used buffer address so as to create a gap in memory 28. This gap is used by the device 10 to facilitate translation of the header 48 received from a source network when the packet must be reconfigured to a header format compatible with a destination network which differs from the source network, as described in a co-pending patent application entitled "Internetworking Device with Enhanced packet Header Translation and Memory" (Attorney Docket No. SYNER-105XX) filed on even date herewith and assigned to the assignee of the present invention and incorporated herein by reference.

The AMA 32 uses the information received from the BMA 22 to attempt to determine to which MAC 14, 18, (referred to also as port) the network associated with the destination node address of the received data packet is attached. The information may also be used by the AMA 32 either to learn of the existence of a source node which is not recognized by the AMA 32 or to determine that the source node of the data packet is an active node whose address should not be removed ("aged") from a table of node addresses located in AMA memory 36 as a result of inactivity.

The AMA 32 determines which MAC 14, 18 or port is to transmit the packet 46 by searching the address table in AMA memory 36. This table contains a list of known node addresses and additionally a designation for the respective MAC 14, 18 corresponding to each node address. The source address 56 is searched in the address table using a binary search technique. Likewise, the destination address 54 is searched in the address table using a binary search technique. The searches are conducted substantially simultaneously by interleaving the source address and destination address searches during alternate clock cycles, as described herein.

Using information provided by the AMA 32, the BMA 22 generates, within a small number clock cycles, a code vector which determines whether and how the received stored data packet 46 is to be processed by a frame processor unit (FPU) 40 and transmitted from the device 10, as is described in greater detail in a co-pending patent application entitled "Packet Characterization Using Code Vectors" (Attorney Docket No. SYNER-103XX) filed on even date herewith and assigned to the assignee of the present invention and incorporated herein by reference. For example, in the case where the received data packet 46 has a destination address 54 corresponding to a different type of network than the source network thereby requiring translation of the packet header 48, such as by the insertion of additional header information, a predetermined code vector is generated by the BMA 22. The predetermined code vector instructs the FPU 40 to execute a program stored in a frame processor memory 44 and to write the necessary header information into the gap in the buffer in which the received packet 46 is stored.

Conversely, if the received data packet 46 has a destination address 54 corresponding to the same type of network as the source network (and if certain other criteria are met), then another code vector is generated by the BMA 22. This code vector instructs the FPU 40 to execute code stored in frame processor memory 44 to begin transmitting the packet 46 to the destination address 54 before the packet 46 is entirely received by the device 10. The technique of beginning data transmission prior to the receipt of the entire packet 46 is referred to as cut-through. Cut-through is achieved without manipulation of the stored packet 46 by the FPU 40 and is described in detail in a co-pending patent application entitled "Method and Apparatus for the Concurrent Reception and Transmission of a Data Packet in an Internetworking Device " (Attorney Docket No. SYNER-104XX) filed on even date herewith and assigned to the assignee of the present invention and incorporated herein by reference.

Thus, the two above-described conditions result in the generation of two different code vectors by the BMA 22. In one embodiment, thirty-one different code vectors may be generated in response to thirty-one different states of the internetworking device 10 and received packet 46.

The code executed by the FPU 40 instructs the BMA 22 to enqueue a Transmit Queue entry on a Transmit Queue (FIG. 3), and then instructs the BMA 22 to transmit the packet 46 from the device 10 to the destination address 54. Once the Transmit Queue entry is enqueued, the FPU 40 can continue processing subsequent packets 46. After the data packet is transmitted by the respective MAC 14, 18 associated with the destination address 54, the buffer in which the packet 46 was stored may be returned and reused to store subsequent packets 46.

Figure 3:
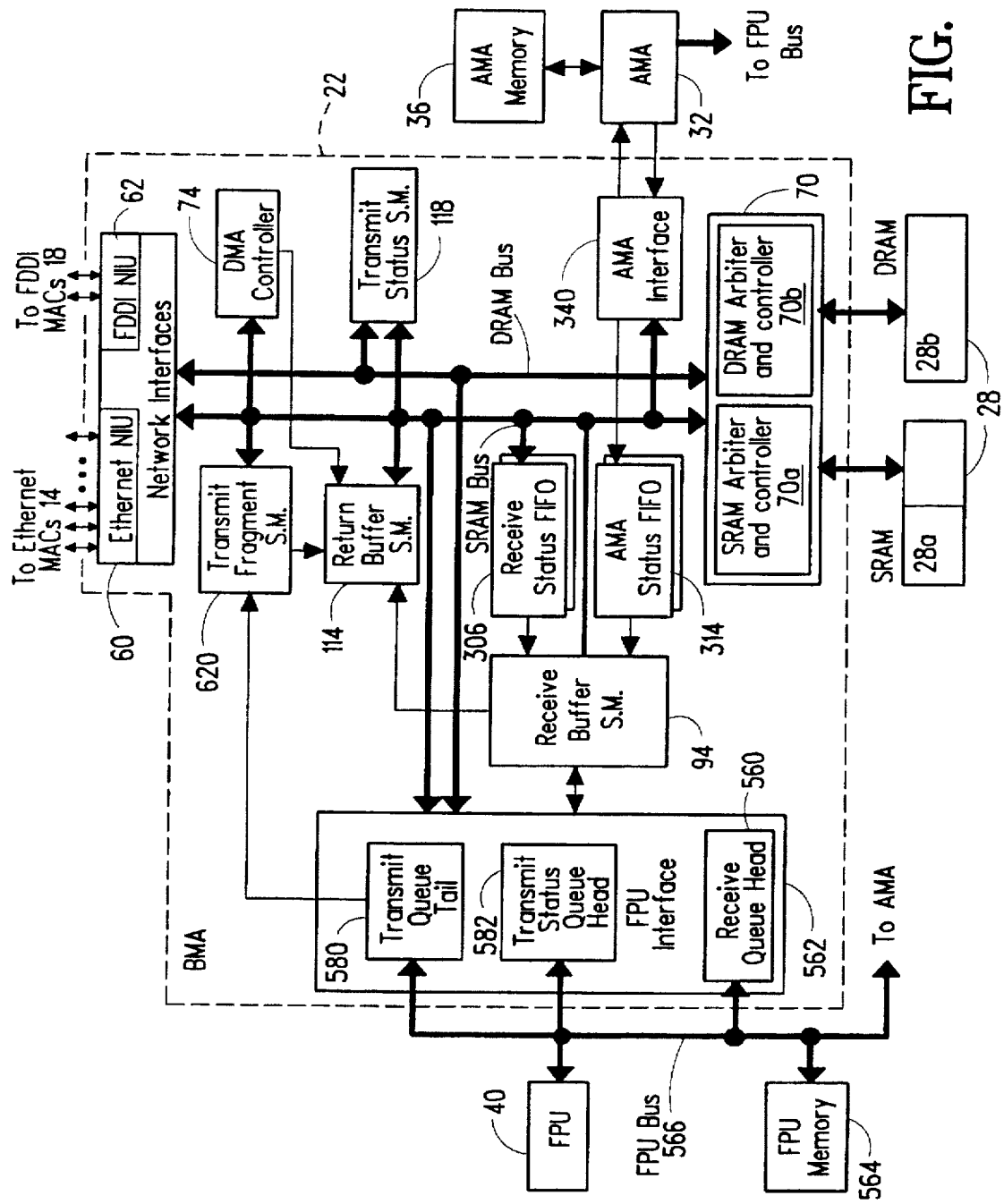
FIG. 3 is a further block diagram of the device of FIG. 1 showing an embodiment of the BMA in greater detail.

Referring to FIG. 3, a packet 46 received at a MAC 14, 18 from a source network is then passed to an associated Network Interface Unit (NIU) 60, 62, respectively. The Ethernet or FDDI NIU 60, 62 sends a request for memory access to a Direct Memory Access (DMA) controller 74. The DMA controller 74 channels the request to one of two arbiters and controllers 70a, 70b (forming an arbiter and controller pair 70) in accordance with whether the predetermined number of bytes to be stored in SRAM have been received. The arbiter pair 70 includes an SRAM arbiter and controller 70a and a DRAM arbiter and controller 70b, each in communication with a respective portion 28a, 28b of memory 28. Each arbiter/controller 70a, 70b grants access to the respective portion of memory 28 and notifies both the DMA controller 74 and the receiving NIU 60, 62 of the grant. The DMA controller 74 provides an address identifying an available buffer in the memory 28 and causes the packet 46 to be transferred from the NIU 60, 62 into the specified buffer.

Figure 4A:
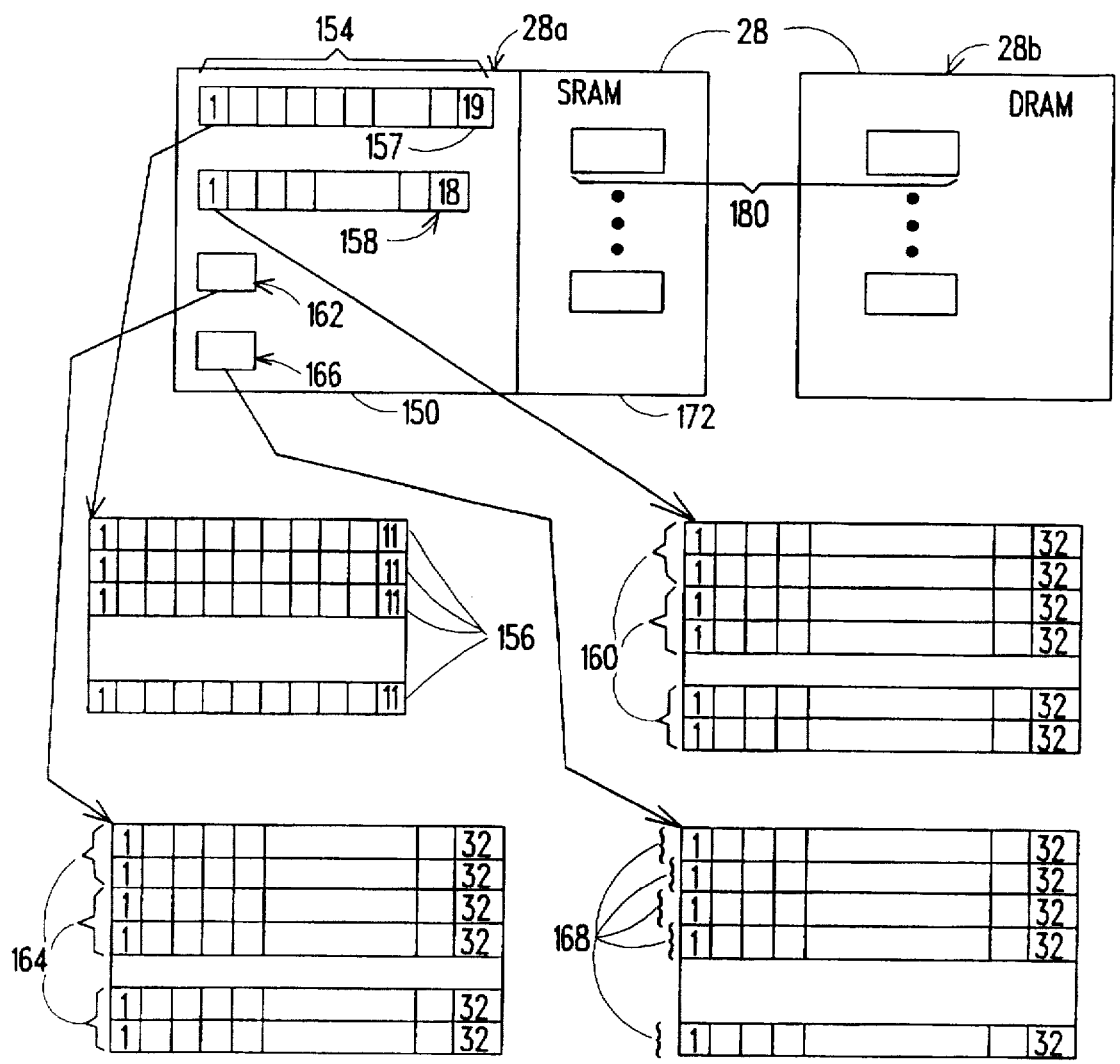
FIG. 4a shows an embodiment of the memory associated with the BMA in FIG. 3.

Referring also to FIG. 4a, the memory 28 includes an SRAM portion 28a and a DRAM portion 28b, as mentioned above. In one embodiment, the size of the SRAM portion 28a is 512KB and the size of the DRAM portion 28b is 4MB. Not all of the 4MB DRAM portion is used however, since in the present embodiment the addresses of the SRAM are interleaved with addresses of the DRAM, as described below in conjunction with FIG. 4b. The SRAM 28a is divided into a control portion 150, including thirty-nine circular Queues 154, 157, 158, 162 and 166, and a buffer portion 172. The buffer portion 172 of SRAM 28a and the DRAM 28b provide buffers 180, some of which are assigned at system initialization to the MACs 14, 18. In one embodiment, the buffer portion 172 and DRAM 28b are divided into 2048 buffers 180.

Figure 4B:
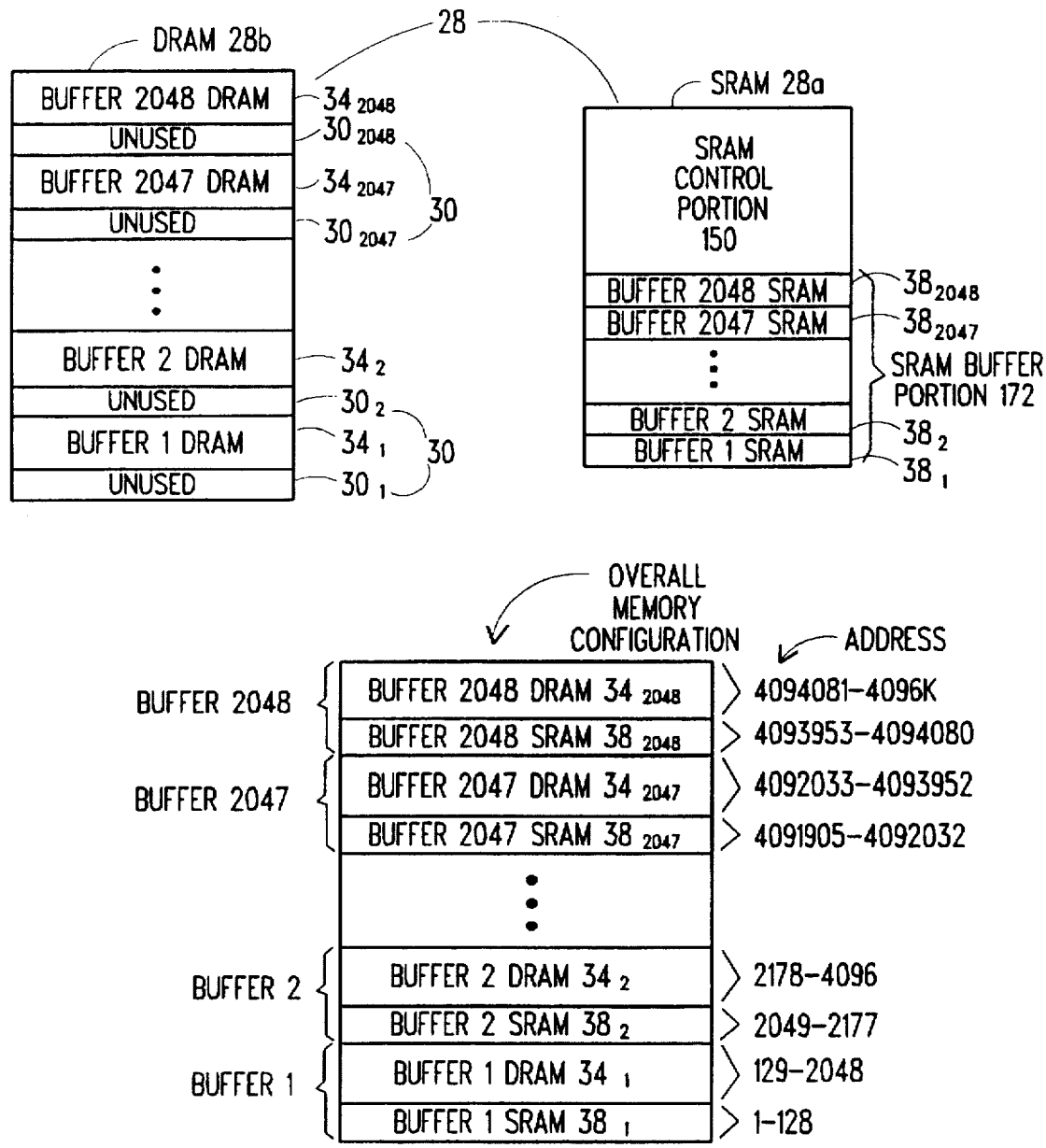
FIG. 4b shows the configuration of the individual SRAM and DRAM memory portions and the overall memory configuration interleaving portions of SRAM and DRAM.

Referring also to FIG. 4b, the configuration of SRAM and DRAM portions 28a, 28b of memory 28 are shown. As is apparent from the view of DRAM 28b in FIG. 4b, unused buffer portions $30_1$–$30_{2048}$ are interleaved with portions of DRAM that make up the buffers 180. Specifically, each unused DRAM portion $30_1$–$30_{2048}$ is 128 bytes in length and logically precedes a portion of DRAM $34_1$–$34_{2048}$ dedicated to a buffer. For example, the first unused block $30_1$, of DRAM precedes a portion $34_1$ of DRAM, with the unused portion $30_1$ and the portion $34_1$ providing the DRAM of the first buffer. Similarly, the last unused block $30_{2048}$ of DRAM precedes a portion $34_{2048}$ of DRAM associated with buffer number 2048. The buffer portion 172 of SRAM 28a (FIG. 4a) is divided into 2048 blocks $38_1$–$38_{2048}$, each 128 bytes long and associated with a respective one of the 2048 buffers.

Also shown in FIG. 4b is the overall memory configuration achieved by interleaving addresses of the SRAM portion 28a with addresses of the DRAM portion 28b. More particularly, the overall memory configuration has sequential addresses, which correspond to blocks of SRAM 28a interleaved with blocks of DRAM 28b. In the illustrative embodiment, the first 128 bytes of memory, at addresses 1–128, correspond to the first 128 bytes of the SRAM buffer portion 172 (i.e., portion $38_1$). The second block of memory, from addresses 129–2048, corresponds to the DRAM buffer portion $34_1$. Together the SRAM portion $38_1$ and the DRAM portion $34_1$ provide buffer 1. The SRAM and DRAM portions $38_1$–$38_{2048}$, $34_1$–$34_{2048}$ are interleaved in this manner to provide buffers 1 through 2048, as shown in the overall memory configuration of FIG. 4b.

At system initialization, a predetermined number of buffers are assigned to each MAC 14, 18 under program control in a manner described below. Specifically, in one embodiment 64 buffers are assigned to each MAC 14, 18. The remaining buffers 180 are assigned to a common pool of buffers which may be used in the event a MAC 14, 18 has used all of its preassigned buffers. A portion of this common pool can be reserved for use by the FPU 40. In one embodiment, the distribution of such buffers is determined at initialization. In another embodiment of the present invention, the distribution of such buffers between MACs 14, 18 and the common pool of buffers is adjusted actively according to measured network activity. Both are described in greater detail in the co-pending patent application entitled "Method and Apparatus for Internetwork Buffer Management" (Attorney Docket No. SYNER-107XX) filed on even date herewith and assigned to the assignee of the present invention and incorporated herein by reference.

Each buffer 180 includes locations in buffer portion 172 of SRAM 28a and locations in DRAM 28b, as will be discussed below in conjunction with FIG. 6. The packets 46 are stored in buffers 180 so as to ensure that, in cases where it is necessary for the memory 28 to be accessed for purposes of header translation, it is the SRAM portion 172 of the buffer 180 that is accessed. Since SRAM has shorter access times than DRAM, requiring memory accesses to be to SRAM advantageously reduces header translation time, as described in a co-pending patent application entitled "Internetworking Device with Enhanced packet Header Translation and Memory" (Attorney Docket No. SYNER-105XX) filed on even date herewith and assigned to the assignee of the present invention and incorporated herein by reference.

Referring to the control portion 150 of the SRAM 28a, nineteen of the thirty-nine circular queues are referred to as Free Buffer Queues (generally labelled 154, 157); eighteen of the queues are Transmit Queues (generally labelled 158); one queue is a Receive Queue 162 and one queue is a Transmit Status Queue 166 containing transmit status information provided by a Transmit Status State Machine (TSSM) 118 in the BMA 22 shown in FIG. 3.

Each of the Free Buffer Queues 154, 157 contains a list of unused buffers 180. The first eighteen Free Buffer Queues 154 correspond to the eighteen MACs 14, 18 and contain lists of buffers 180 available only to the respective MAC 14, 18. In the illustrative embodiment in which each of the MACs initially has sixty-four unused dedicated buffers, each of the Free Buffer Queues 154 contains sixty-four entries 156. The Free Buffer Queue entries 156 contain the eleven bit address of the respective buffer 180 in memory 28. In the same illustrative embodiment, the eleven bit entries enable addressing 2048 buffers. The nineteenth Free Buffer Queue 157 is a common Free Buffer Queue which lists buffers which may be used by any of the MACs 14, 18 in the event that the supply of buffers originally assigned to the per port Free Buffer Queues 154 is exhausted.

Each of the eighteen Transmit Queues 158 is associated with a corresponding one of the MACs 14, 18 and contains entries corresponding to packet transmissions enqueued by the FPU 40 for processing by the respective MAC 14, 18. More particularly, the Transmit Queues 158 are configurable to between 0 and 1500 entries deep, with each entry 160 comprising two, thirty-two bit words, as shown. In one embodiment, each Transmit Queue 158 is 500 entries deep. The content of the transmit entries 160 will be described further in conjunction with FIG. 14a and 14b.

The Receive Queue 162 contains entries 164 corresponding to packets 46 received by the device 10 for processing by the FPU 40. The Receive Queue 162 is configurable to between 0 and 4096 entries deep, with each entry 164 comprising two, thirty-two bit words. In one embodiment, the Receive Queue 162 is 4096 entries deep. The format of the Receive Queue entries 164 will be described below in conjunction with FIG. 12a and 12b.

The Transmit Status Queue 166 contains an entry 168 for each packet 46 that has been transmitted from the internetworking device 10 in error. More particularly, the transmit status entries 168 indicate which error(s) occurred in the transmission of the corresponding packet 46 from the device 10. The Transmit Status Queue 166 is configurable to between 0 and 4096 entries deep, and, in one embodiment is 2048 entries deep, with each entry 168 being one, thirty-two bit word.

Figure 5:
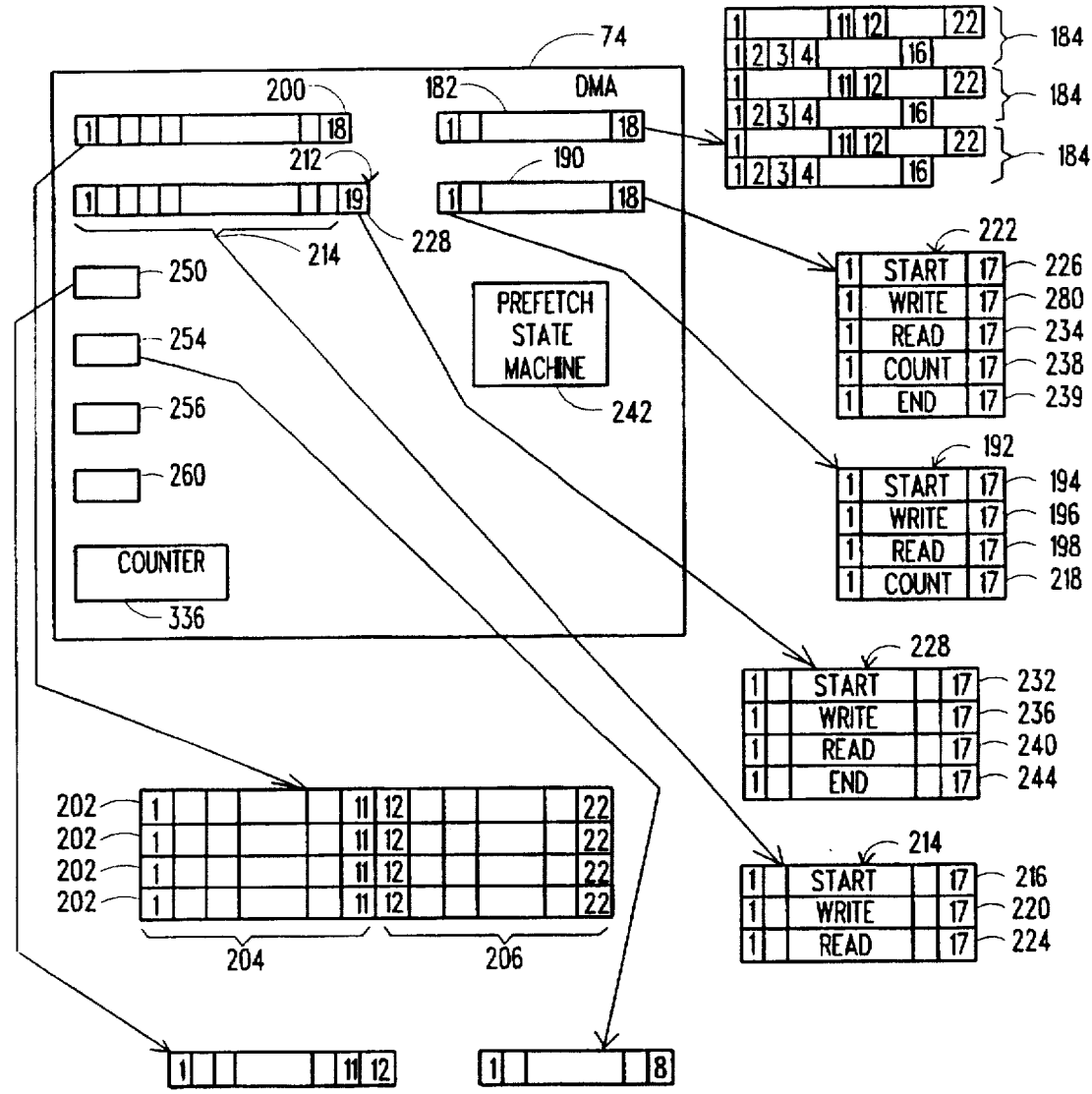
FIG. 5 shows the DMA controller of FIG. 3 in greater detail.

Referring also to FIG. 5, the DMA controller 74 includes eighteen Free Buffer Prefetch Queues 200, corresponding to the eighteen MACs 14, 18. Each queue contains four prefetch entries 202 received from a respective Free Buffer Queue 154 in memory 28. More particularly, the prefetch register entries 202 include the address of buffers available to the respective MAC 14, 18, as will be described. With this arrangement, the DMA controller 74 is able to allocate an incoming packet 46 to a buffer 180 quickly, without having to access the respective Free Buffer Queue 154 in the SRAM control portion 150 (FIG. 4a). Each entry 202 of the Free Buffer Prefetch Queues 200 is twenty-two bits long, with the first eleven bits 204 providing the address of the available buffer and the second eleven bits 206 providing a body offset pointer (i.e., a pointer to the buffer location following the gap). The first eleven bits 204 are taken from the respective Free Buffer Queue 154, and the second eleven bits 206 are taken from a Body Offset Register 260 of the DMA controller 74 (discussed below).

The DMA controller 74 further contains nineteen Free Buffer Queue Control Blocks (QCBs) 212. Each of the nineteen QCBs 212 corresponds to one of the nineteen Free Buffer Queues 154, 157 (FIG. 4a) in the SRAM control portion 150. The QCBs 212 maintain pointers to the Free Buffer Queues 154, 157, with one of the pointers indicating the next available buffer 180 in the queues 154, 157 for storing incoming packets 46. Thus, when one of the entries 202 in a Free Buffer Prefetch Queue 200 is used (i.e., is assigned to store an incoming packet 46), the DMA controller 74 prefetches the address of the next available buffer within the respective Free Buffer Queue 154 based upon the current pointers in the respective QCB 212. Alternatively, if there are no available buffers remaining in the respective Free Buffer Queue 154, then the DMA controller 74 prefetches the next available buffer within the common Free Buffer Queue 157. Then, the DMA controller 74 adjusts the pointers in that QCB 212 to reflect the use of the prefetched buffer.

To this end, each of the first eighteen Free Buffer QCBs 214 contains three pointers, a START pointer 216, a WRITE pointer 220, and a READ pointer 224. The nineteenth Free Buffer QCB 228 contains four pointers, a START pointer 232, a WRITE pointer 236, a READ pointer 240, and an END pointer 244. Each of the pointers in the QCBs 212 is seventeen bits long, corresponding to an address in the control portion of SRAM where the Free Buffer Queue 154, 157 resides. While the first eighteen QCBs 214 do not contain END pointers 244, the function of the END pointer 244 (i.e., to indicate when the WRITE pointer 236 and the READ pointer 240 are to loop back to the head of the respective Free Buffer Queue 154) is provided by the START pointer 216 of the next sequential QCB 214, 228.

At initialization, the START pointer 216, 232 and the WRITE pointer 220, 236 of each QCB 214, 228, respectively, point to the first location in the respective Free Buffer Queue 154, 157, which after initialization contains the address of the first buffer associated with the respective port. The READ pointer 224, 240 indicates the locations preceding the location at which the address of the next buffer to be returned after use is written. The END pointer 244, in the nineteenth QCB 228, points to the last buffer in the common Free Buffer Queue 157.

The START pointer 216, 232 is fixed at the first entry in the respective Free Buffer Queue 154, 157. The WRITE pointer 220, 236 is incremented during operation, as buffers in the Free Buffer Queues 154, 157 are assigned to incoming packets 46. The READ pointer 224, 240 is incremented during operation as buffers are returned to their respective Free Buffer Queues 154, 157 after use. The END pointer 244 is fixed at the last buffer in the common Free Buffer Queue 157.

When the WRITE pointer 220, 236 points to the same location as the END pointer 244 (or equivalently, the START pointer 216 of the next sequential QCB 214), the WRITE pointer 220, 236 is incremented to the location of the fixed START pointer 216, 232, so as to cause the WRITE pointer 220, 236 to "loop back" to the beginning of the buffer list, thereby treating this list as a circular queue. Likewise, when the READ pointer 224, 240 points to the same location as the END pointer 244 (or to the START pointer 216 of the next sequential QCB 214), the READ pointer 224, 240 is incremented to the location of the fixed START pointer 216, 232, causing the READ pointer 224, 240 to "loop back" to the beginning of the buffer list.

The transmission components of the DMA controller 74 somewhat mirror the buffer allocation components in that, the DMA controller 74 contains eighteen Transmit Prefetch Queues 182, corresponding to the eighteen MACs 14, 18. Each Transmit Prefetch Queue 182 contains three entries 184. A transmit Prefetch Queue entry 184 consists of a twenty-two bit buffer address and a sixteen bit control and length word. The control and length word consists of three control bits and a thirteen bit packet length field. The control bits indicate "cut-through", "end of frame", and "do not free buffer". The two words of each Transmit Prefetch Queue entry 184 correspond to an entry 160 (FIGS. 14a and 14b) in a Transmit Queue 158.

The DMA controller 74 additionally includes eighteen Transmit QCBs 190, each likewise corresponding to one of the eighteen MACs 14, 18. The first seventeen Transmit QCBs 192 contain a COUNT field 218 and three pointers: a START pointer 194, a WRITE pointer 196, and a READ pointer 198. The START, READ, and WRITE pointers are as described above in conjunction with the Free Buffer QCBs 212. The COUNT field 218 maintains a count of transmitted Transmit Queue entries 184. The last Transmit QCB 222 contains five pointers: a START pointer 226, a WRITE pointer 280, a READ pointer 234, COUNT pointer 238 and an END pointer 239. The END pointer 239 functions as described above in conjunction with the nineteenth Free Buffer QCB 228. Each Transmit QCB pointer is seventeen bits long, corresponding to and address in the control portion of SRAM where the Transmit Queue 158 resides.

When a Free Buffer Prefetch Queue 200 contains less than four entries 202, a Prefetch State Machine 242 prefetches the address of the next available buffer within the respective Free Buffer Queue 154, 157 in response to the pointers in the Free Buffer QCBs 212. Similarly, when a Transmit Queue 182 contains less than three entries 184, the Prefetch State Machine 242 prefetches the next entry within the respective Transmit Queue 158 in response to the Transmit QCBs 190.

In operation and considering illustrative Free Buffer QCB 214, initially, the START and WRITE pointers 216, 220 point to the first location of the respective Free Buffer Queue 154 and the READ pointer 224 points to the last entry in the respective Free Buffer Queue 154. When the associated Free Buffer Prefetch Queue 200 becomes not full the DMA controller 74 reads the address of the buffer pointed to by the WRITE pointer 220 and writes it into the next available location in the Free Prefetch Queue 200. Thereafter, the WRITE pointer is incremented by one.

Conversely, once use of a buffer is completed and the buffer is returned to the respective Free Buffer Queue 154, the address of the buffer to be returned is written into the location of the Free Buffer Queue 154 subsequent to the location pointed to by the READ pointer 224. Thereafter, the READ pointer is incremented by one.

Recall that the Free Buffer Queues 154, 157 contain sixty-four entries 156. However, each of the Free Buffer Queues 154, 157 contains an additional location which is used to indicate whether the Free Buffer Queues 154, 157 are empty or full. When the WRITE pointer 220 and the READ pointer 224 are separated by one queue entry, then the respective Free Buffer Queue 154, 157 is full (i.e., no buffers have been used and all are available). When the WRITE pointer 220 points to the same location as the READ pointer 224, the respective Free Buffer Queue 154, 157 is empty (i.e., there are no more assigned buffers available for receiving incoming packets). When the Prefetch State Machine 242 attempts to "fetch" a buffer and determines that there are no more available buffers assigned to the respective MAC 14, 18, then the Prefetch State Machine looks to the last Free Buffer Prefetch QCB 228 associated with the common Free Buffer Queue 157 to fetch a buffer address.

The DMA controller 74 further includes two registers 250, 254 dedicated to allocating buffers 180 from memory 28 for use by the FPU 40 for network management purposes. The first such register is an FPU Available Buffer register 250 which includes the address of the next available buffer from the common Free Buffer Queue 157 for use by the FPU 40. The FPU Available Buffer register 250 is twelve bits wide. The first eleven bits are buffer address bits. The twelfth bit indicates whether the buffer address in the first eleven bits is available for use. The second such register is an FPU Buffer Reserve Count register 252 which specifies how many buffers 180 are reserved for use by the FPU 40. This number is initialized by the FPU 40.

A Header Offset Register 256 is provided in the DMA controller 74 for each buffer 180 and stores the first address in the respective buffer at which the destination address 54 of the packet header 48 is stored. Similarly, a Body Offset register 260 is provided in the DMA controller 74 for each buffer 180 and stores a pointer to the first location in the respective buffer after the header and gap.

An illustrative packet buffer 180 from one of the Free Buffer Queues 154, 157 is shown in FIG. 6 to have a length of 2048 bytes. The first 128 bytes of the buffer 180 are located in the buffer portion 172 of SRAM 28a (FIG. 4a) and provide an SRAM storage area 268 of the buffer 180, while the remaining 1920 bytes of the buffer 180 are located in the DRAM 28b and provide a DRAM storage area 332. A first predetermined number of bytes of the buffer 180 (i.e., the control storage area 270) are reserved for buffer control information, including a Buffer Owner field 274 and a Buffer Used Count field 278. In the illustrative embodiment, the control storage area 270 is seven bytes in length.

The Buffer Owner field 274 identifies the Free Buffer Queue 154, 157 in which the buffer 180 is listed. This field 274 is used in the releasing of the buffer 180 after the last transmission of a packet 46 contained therein. Upon initialization, an identifier is written into the Buffer Owner field 274, identifying which of the MACs 14, 18 is assigned the particular buffer 180. With this arrangement, when it is time to return the buffer 180, a Return Buffer State Machine 114 (FIG. 3) can associate the buffer 180 with a particular MAC 14, 18. A value of 0–17 in the Buffer Owner field 274 indicates that the buffer 180 is assigned to a Free Buffer Queue 154 associated with one of the MACs 14, 18. A Buffer Owner field 274 having the value of 255 indicates that the buffer 180 is assigned to the common Free Buffer Queue 157. Buffer Owner field values of 18–253 indicate that the packet buffer 180 is reserved for network port expansion. Finally, a Buffer Owner field 274 with a value of 254 indicates that the packet buffer 180 is permanently allocated to the FPU 40, and is never to be returned.

The Buffer Used Count field 278 is also used in the return of the buffer 180 after the last transmission of a packet stored therein and, specifically, indicates whether the buffer 180 should be returned for reuse. The Buffer Used Count field 278 contains a value indicating the number of times the buffer 180 is to be transmitted before the buffer is returned. The Buffer Used Count field 278 is used primarily for multicast transmissions, where data from a single buffer is transmitted by multiple ports before the buffer is returned, as described below in conjunction with FIG. 13.

The source 56 and destination 54 addresses of the packet header 48 are read into an address header storage area, including a destination address field 282 and a source address field 286 of the buffer 180. In the illustrative embodiment, the address header storage area contains twelve bytes, for storing the six bytes of destination address 54 and the six bytes of source address 56. A configurable header offset pointer 290, stored in the Header Offset Register 256 of the DMA controller 74, defines the starting location of the destination address field 282 within the buffer 180. Thus, the position of the destination 54 and source 56 addresses within the buffer 180 is always the same, regardless of packet type. The header offset pointer 290 is selected so as to leave a one byte location preceding the destination address field 282 (i.e. the FDDI frame control field 294) for storage of a frame control entry 57 (FIG. 2) associated with an FDDI packet 46'''. Thus, in a buffer 180 assigned to an FDDI MAC 18, the frame control entry 57 is stored in the FDDI frame control field 294 preceding the destination address storage field 282.

A predetermined number of bytes of the SRAM storage area 268, following the source address field 286, are reserved for the translation gap 298. This gap 298 is reserved for the addition of translation bytes (i.e., bytes which may be overwritten by the FPU 40 for the purpose of translating the packet 46 from one network format to another). This reserved space within the buffer 180 permits the FPU 40 to perform translation without having to relocate or move either the packet header 48 or data 50 within the buffer 180. In the present embodiment, the translation gap 298 is twenty-four bytes in length.

Figure 9A:
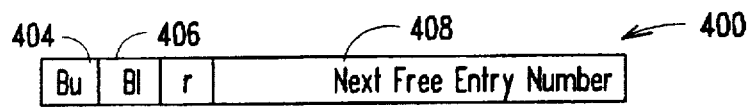
FIGS. 9a and 9b depict an illustrative data format for the AMA Status FIFO.
Figure 9B:
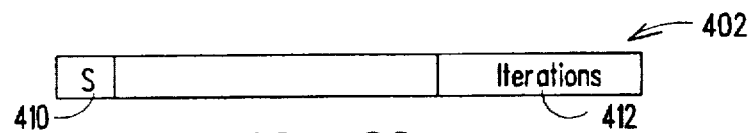
Figure 10A:
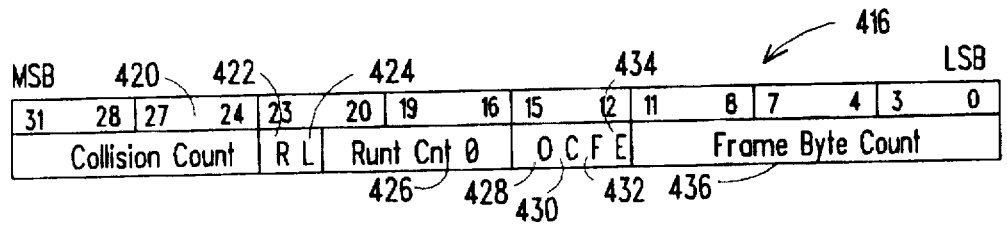
FIGS. 10a and 10b show an illustrative data format for the Receive Status FIFO (for both the Ethernet and FDDI networks)
Figure 10B:
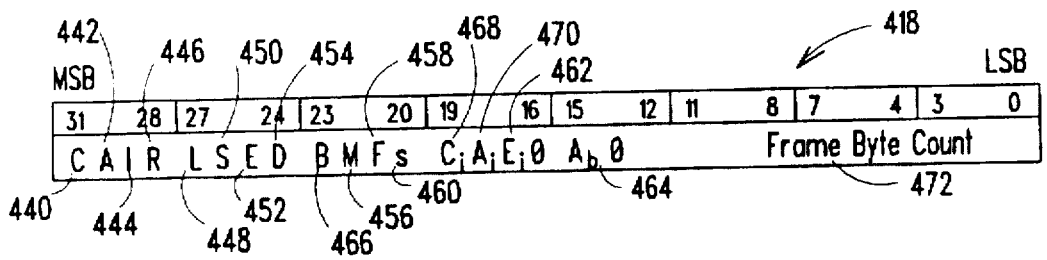

Receive status, provided by a Receive Status FIFO 306 (FIG. 3) and described below in conjunction with FIGS. 10a and 10b, is temporarily stored in a receive status field 310 of the buffer 180, within the translation gap 298. Information provided by an AMA Status FIFO 314 and described below in conjunction with FIGS. 7–9b, is stored in an AMA field 318 of the buffer 180, immediately following the receive status field 310.

A configurable body offset pointer 320 stored in the Body Offset Register 260 in the DMA controller 74 points to a predetermined number of words beyond the AMA field 318. In the buffer 180 shown, the body offset pointer 320 is spaced from the end of the AMA field 318 by four bytes.

The remainder of the received packet 46, including the data 50, is stored starting in the remainder of the SRAM portion 172, referred to as the after gap storage area 328. If the packet 46 requires more than the eighty-four bytes available in the after gap storage area 328, the remainder of the packet 46 is read into the DRAM storage area 332 of the buffer 180 located in the DRAM portion 28b of memory 28.

Upon receiving a packet 46, the DMA controller 74 assigns a buffer 180 to the received packet 46 from the respective Free Buffer Prefetch Queue 200 (FIG. 5). Thereafter, the destination 54 and source 56 addresses of the packet 48 header are written into the destination address field 282 and the source address field 286 of the buffer 180, beginning at the header offset pointer 290. A counter 336 located in the DMA controller 74 (FIG. 5) counts the first twelve bytes of the received packet in the case of an Ethernet source node or the first thirteen bytes in the case of an FDDI source node, based upon the type of port (FDDI or Ethernet) receiving the packet 46.

Once the appropriate count occurs, the DMA controller 74 increments the address in the SRAM storage area 268 to which the packet 46 is being transferred to the body offset pointer 320. In the illustrative embodiment, the SRAM address is incremented by twenty-four bytes, corresponding to an eight byte space 299, the four byte receive status field 310, the eight byte AMA field 318, and the four byte space 324. The remainder of the packet 46 is then written into the buffer 180 starting at the body offset pointer 320. If the packet 46 exceeds the eighty-four bytes available in the after gap storage area 328, then the remainder of the packet 46 is written into the DRAM storage area 332.

The twelve bytes of the received packet 46, which include the source 56 and destination 54 addresses for the packet 46, are written not only to the buffer 180 as described above, but also through an AMA interface 340 (FIG. 3) to the AMA 32. While the packet 46 is being stored in memory 28, the AMA 32 searches the address table in the AMA memory 36 for the source 56 and destination 54 addresses contained in the packet 46.

The FPU 40 issues commands to the AMA 32 and receives command results from the AMA 32 through a direct processor interface. The AMA's response to the FPU's command is reported to the FPU 40 in two, sixteen bit words 400, 402 (FIGS. 9a and 9b). The highest order bit (Bu) 404 of the first word 400 (FIG. 9a) indicates whether the AMA 32 is presently busy and is executing the last issued command. Bit 14 (Bl) 406 indicates that the AMA 32 is currently blocked and is copying command data in preparation for executing a command. Bits twelve through zero 408 are the address of the next free entry 344 in the AMA memory 36.

The highest order bit (S) 410 of the second word 402 (FIG. 9b) returns the status result of the last command executed by the AMA 32. Whether the bit is set or cleared depends upon the command executed. Bits three through zero 412 specify the maximum number of search iterations which can be performed by the AMA 32 before an error condition is generated. The remaining bits are unspecified.

Figure 7:
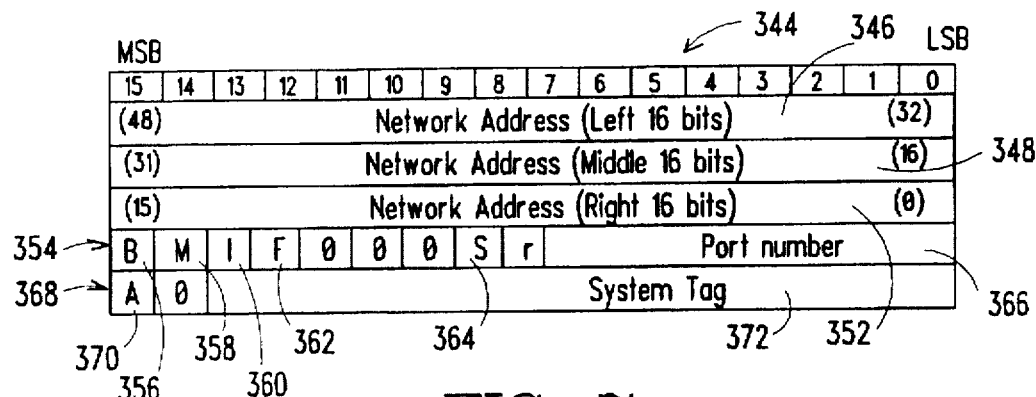
FIG. 7 shows an embodiment of an entry in AMA memory.
Figure 8A:
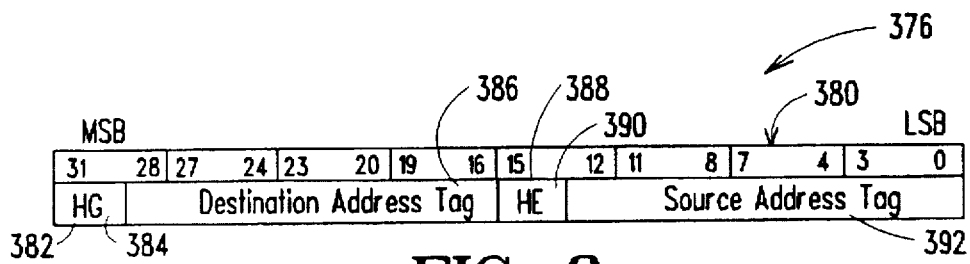
FIGS. 8a and 8b depict an embodiment of AMA status words.
Figure 8B:
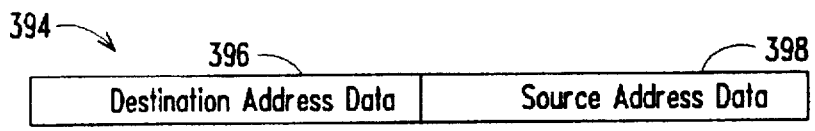

The form of the address table in the AMA memory 36 is shown in FIG. 7. Each entry 344 in the table corresponds to a node known to the AMA 32. The 48 bits of the network address of each node known to the AMA 32 are stored as three, sixteen bit shortwords 346, 348 and 352 beginning each table entry 344. A fourth shortword 354 of the table entry 344 provides various flags and a port number for this particular address. A fifth shortword 368 provides aging information and a system tag.

Specifically, the highest order bit in the fourth shortword 354, designated (B) 356 indicates that this network address is a broadcast address. The next highest bit, designated (M) 358 indicates that this network address is a multicast address. Bit 13, the internal bit (I) 360 indicates that this address belongs to the receiving MAC. If a frame belongs to a receiving MAC, it is either a frame to be routed or a network management frame. Bit 12, the (F) bit 362 indicates that the node's address is associated with an address filter. Filters are used to filter out (i.e., not forward) frames that meet certain criteria. Filters are configurable and the FPU 40 makes filtering decisions on a per frame basis. Bit 8, the static bit (S) 364 indicates that the address is static and was entered by a system manager, rather than being dynamic or learned by the system through packet transfers. Bits six through zero 366 designate the MAC 14, 18 associated with the node having the specified address. All remaining bits are unspecified or reserved.

The fifth shortword 368 of the entry 344 contains fifteen bits, an aging bit (A) 370 and fourteen bits 372 providing a system tag. The aging bit 370 is set whenever the source address 56 of the received packet 46 matches the address entry in the table. The aging bit 370 is periodically cleared by the FPU 40 and, if the bit is not set within a predetermined amount of time, the node address is cleared from the AMA memory 36. Addresses designated as static, by the setting of the static bit 364 (S), cannot be aged from the table. Bits thirteen through zero 372 provide a system tag which is a logical address to the AMA table (as opposed to a physical address). More particularly, a table of logical addresses to the AMA entries is maintained in the FPU's memory 40. This table maintains certain information about the ports, such as filtering information. The reason that the logical address system tag 372 is fourteen bits long (as opposed to the thirteen bits necessary to address each location of the AMA table) is to prevent two AMA table physical addresses from being given the same logical address while the table is being updated, i.e., during the period when one entry is being purged and another added. The remaining bit, bit 14, is unused.

Once the AMA 32 has completed the search of the address table in the AMA memory 36, it returns the information retrieved from the table to the BMA 22 through the AMA interface 340. A Receive Buffer State Machine (RBSM) 94 of the BMA 22 processes this data from the AMA 32 and formats it into two, thirty-two bit words, termed AMA status words 376 shown in FIGS. 8a and 8b. Bit 31 (H) 382 of the first word 380 (FIG. 8a) is a destination hit bit indicating that the packet's destination address 54 was located in the AMA table of addresses. Bit 30 is the group bit (G) 384 indicating that destination address 54 is either a broadcast or a multicast address. Bits twenty-nine through sixteen 386 form a 14 bit identifier used to identify, to the FPU 40, the entry 344 corresponding to the destination address 54. Similarly, bit fifteen is a source hit bit (H) 388 indicating that the packet's source address 56 was located in the AMA table of addresses. Bit fourteen (E) 390 indicates that the port upon which the source address 56 was received is different from the port upon which this address was last learned. Bits thirteen through zero 392 form a fourteen bit identifier used to identify the source memory entry to the FPU 40.

The first 16 bits of the second word 394 (FIG. 8b) contain data 396 associated with the destination node, such as the port through which the node with the destination address 54 can be accessed. The last 16 bits contain data 396 associated with the source address including the port upon which the packet is received.

When a packet 46 has been completely received by the BMA 22 the receive status indicated by the MAC 14, 18 is stored in the Receive Status FIFO 306 associated with the MAC 14, 18. The format of entries 416, 418 in the Receive Status FIFO 306 is shown in FIGS. 10a and 10b for the Ethernet and FDDI networks, respectively.

Specifically, the format for an entry 416 (FIG. 10a) in the Receive Status FIFO 306 associated with an Ethernet network is thirty-two bits long and utilizes bits 31 through 24 as a counter 420 indicating the number of collisions detected on the network since the last successfully received packet 46. Bits 23 and 22 (labelled 422 and 424 respectively) are error condition bits indicating that the packet 46 was too short (a runt frame) or too long, respectively. Bits 21 through 17 define a counter 426 which indicates the number of runt frames received since the last successfully received packet. Bits 15 through 12 are error bits which indicate typical Ethernet error conditions, such as: an overrun (O) 428 of a receive FIFO in the Ethernet MAC 14; a collision (C) 430; a framing error (F) 432; or a Frame check sequence (FCS) (E) 434. Bits eleven through zero 436 indicate the number of bytes in the received packet 46. Bit 16 is unspecified.

Similarly, the format of an entry 418 (FIG. 10b) in the Receive Status FIFO 306 associated with an FDDI network is also thirty-two bits long. Bits 31 through 26 indicate that the received packet has characteristics as specified by the frame control entry 57 (FIG. 2). Specifically, bit 31 defines the synchronous class frame bit (C) 440; bit 30 defines the short MAC address frame bit (A) 442 (a received frame error condition); bit 29 is the implementer frame type bit (I) 444 as specified in the frame control field definition of the FDDI ANSI standard ; bit 28 is the reserved frame type bit (R) 446; bit 27 is the LLC frame type bit (L) 448 and bit 26 is the SMT/MAC frame type bit (S) 450. Bits 444, 446, 448 and 450 define frame types within FDDI, of which only two (bits 448 and 450) are used for normal data traffic.

Bits 25, 24, 22 through 20, 17 and 15 indicate various receive frame errors. Specifically, bit 25 indicates a Frame Check Sequence (FCS) Error (E) 452; bit 24 indicates a data length error (D) 454; bit 22 indicates that a MAC Reset has been issued and is set as a result of a software or hardware reset, or internal errors (M) 456; bit 21 indicates a format error (non-DATA, IDLE or Ending Delimiter Symbol) (F) 458; and bit 20 indicates that an IDLE symbol was received while expecting part of a Protocol Data Unit (PDU) (usually indicating that the PDU was stripped by a previous node on the network) (s) 460; bit 17 (Ei) 462 indicates that the FDDI MAC 28 detected an error on receive and set an "E" bit in the outgoing frame (at the end of the FDDI frame); and bit 15 ($A_b$) 464 indicates that the received packet 46 was aborted.

Bit 23, the big frame bit (B) 466, indicates that the received packet 46 contained more than 4500 bytes. Bit 19, the ($C_i$) indication bit 468 indicates that a frame copied indication was detected, while bit 18, the ($A_i$) indication bit 470, indicates that an address recognized indication was detected. Finally, bits thirteen through zero 472 indicate the received frame byte count length, including the trailer 52. The remaining bits are unspecified.

Figure 11:
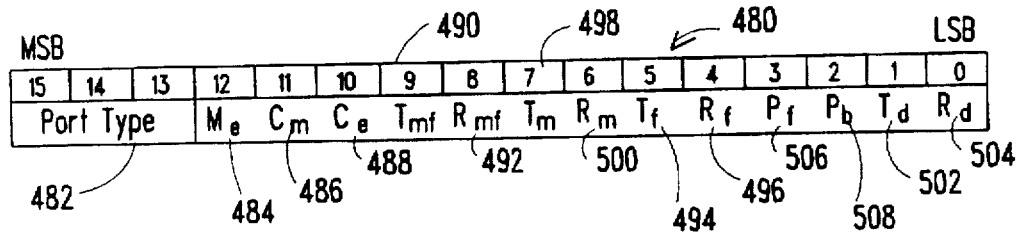
FIG. 11 shows an illustrative data format for the Port Status register of FIG. 3.

In addition to the Receive Status FIFO 306 (FIG. 3), Port Configuration registers 474 located in the RBSM 94 (not shown in FIG. 3) are also associated with each MAC 14, 18 and contain entries having a format shown in FIG. 11 indicating the current configuration for both the receive and transmit data communications paths associated with the MAC 14, 18. The illustrative Port Configuration register word 480 shown in FIG. 11 is sixteen bits long. Bits fifteen through thirteen 482 contain an indication of the type of MAC 14, 18 associated with the Port Configuration register 474. Bit 12, the monitor enable ($M_e$) bit 484 is set if the MAC 14, 18 is being monitored by a remote monitor. In such a case, all packets 46 received and transmitted by the MAC 14, 18 must also be sent to the monitor. Bit 11, the cut-through multicast enable bit ($C_m$) 486, indicates that multicast packets received or sent to this port may undergo cut-through. Similarly, Bit 10, the cut-through enable bit ($C_e$) 488, indicates that unicast packets received from and sent to this port may undergo cut-through. Bits 9, 8, 5 and 4 indicate that a user-defined filter that has been manually assigned to the port is enabled. Specifically, bit nine ($T_{mf}$) 490 indicates a transmit multicast path filter is enabled and should be applied to all multicast packets presented to this port for transmit; bit eight ($R_{mf}$) 492 indicates a receive multicast path filter is enabled and should be applied to all multicast packets received on this port to determine whether or not the multicast packet should be multicasted through the device 10; bit five ($T_f$) 494 indicates a transmit path filter is enabled and should be applied to all packets presented to this port for transmit; and bit four ($R_f$) 496 indicates a receive path filter is enabled and should be applied to all packets received on this port.

Bits 7, 6, 1, and 0 indicate that various paths for this port have been manually disabled at the MAC layer and that all packets presented on this port should be discarded. The setting of these bits causes packets to be discarded by the BMA 22, as contrasted to filtering by the FPU 40. Specifically, bit seven ($T_m$) 498 provides an indication for the transmit multicast path; bit six ($R_m$) 500 provides an indication for the receive multicast path; bit one ($T_d$) 502 provides an indication for the transmit path; and bit zero ($R_d$) 504 provides an indication for the receive path.

Bit three ($P_f$) 506 is used to indicate that the network port is not currently in a "bridge" forwarding state and is not allowed to forward frames. When bit 3 is set, the device 10 can learn addresses from this port, and it must receive and process all network management messages from other internetworking devices. Bit two ($P_b$) 508 is used to indicate that this network port is currently in a "bridge" blocking state and the device 10 is not allowed to forward packet 46 or learn network addresses received on this port, although the device 10 must still receive and process all application messages.

Referring to FIG. 3, the Receive Buffer State Machine (RBSM) 94 polls the Receive Status FIFO 306, the AMA Status FIFO 314 and the Port Configuration Registers 174 to determine how the received packet 46 should be handled. From this information the RBSM 94 generates a two long word Receive Queue entry 164, which includes a code vector and other information required by the FPU 40 in determining how to process the received packet 46.

Figure 12A:
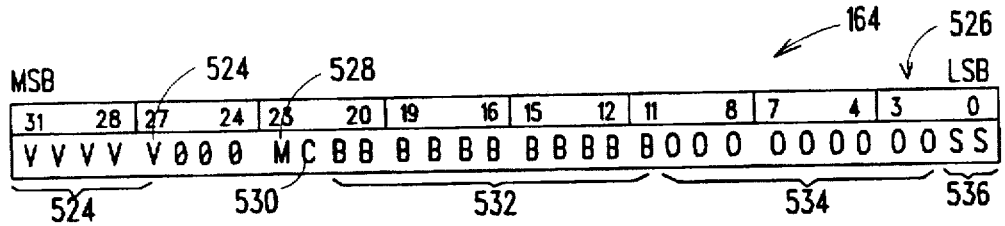
FIGS. 12a and 12b show an illustrative Receive Queue entry in a Receive Queue.
Figure 12B:
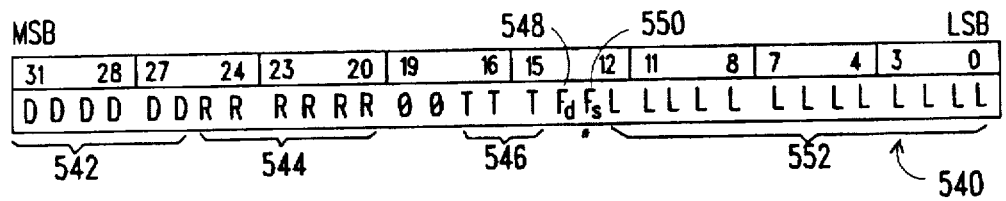

Referring to FIGS. 12a and 12b, the format of the Receive Queue entry 164 is shown. The five highest order bits thirty-one through twenty-seven 524 of the first word 526 (FIG. 11a) of the Receive Queue entry 164 define the code vector which indicates to the FPU 40 which software algorithm should be executed by the FPU 40. Bit twenty-three (M) 528 indicates that the buffer 180 associated with the packet 46 is part of a multi-buffer packet. Bit twenty-two (C) 530 indicates that the packet 46 should be handled as a cut-through packet. Bits twenty-one through eleven 532 indicate which buffer 180 contains the received packet 46. Bits ten through two 534 indicate the body offset pointer 320 (FIG. 6). Finally, bits one and zero 536 identify specific conditions associated with the source address of the received packet 46. The remaining bits are unspecified.

Bits thirty-one through twenty-six 542 of the second word 540 (FIG. 11b) of the Receive Queue entry 164, indicate the destination port of the received packet 46, as determined by the AMA 32. Bits twenty-five through twenty 544 indicate the port number on which the packet 46 was actually received. Bits seventeen through fifteen 546 provide a translation code, indicating the specific packet translation processing required to transmit the received packet information to a remote monitor. Bit fourteen ($F_d$) 548 is set if the destination address 54 was found in the AMA memory 36 and if a filter is enabled in the Port Configuration Register for the destination port. Bit thirteen ($F_s$) 550 is set if the source address 56 was found in the AMA memory 36 and if a filter is enabled in the Port Configuration Register for the source port. Finally, bits twelve through zero 552 specify the length (in bytes) of the received packet 46, exclusive of the trailer 52. The remaining bits are unspecified.

Since the packet length can only be known once an entire packet 46 is received, there is no way for a packet undergoing cut-through to have a valid length field entry 552. Thus, for cut-through packets, the length field 552 is set to zero.

The RBSM 94 (FIG. 3) transfers the Receive Queue entry 164 to the Receive Queue 162 located in the control portion 150 of SRAM 28a (FIG. 4a). The RBSM 94 copies entries 164 from the SRAM Receive queue 162 into a Receive Queue Head 560 located in an FPU interface 562. The Receive Queue Head 560 contains one entry that is two words long. The FPU 40 reads an entry from the Receive Queue Head 560 and executes an appropriate algorithm from the frame processor memory 564 in response to the code vector 524 and, if applicable, the translation code 546 contained in the Receive Queue entry 164 for that packet (FIG. 11a). When processing requires the FPU 40 to access the packet 46 in the buffer 180, a buffer pointer is used by the FPU 40 to retrieve packet data 50 from the buffer 180. The buffer pointer includes a field specifying the address of the BMA 22, a field specifying the buffer 180 to be accessed and a field specifying the type of buffer access. Illustrative types of buffer access are direct access, in which the FPU 40 reads data from a buffer 180 and processes such data, or request response access in which a read operation is requested, but the FPU bus 566 is available for other data transfer operations and reads the requested data from a register once the data is read from memory. Communication between the FPU 40, the frame processor memory 564, the BMA 22, and the AMA 32 is via an FPU Bus 566.

Once the FPU 40 has completed the algorithm invoked by the code vector 524, the FPU 40 enqueues, in a Transmit Queue Tail 580 (FIG. 3), a Transmit Queue entry 160. In one embodiment, the Transmit Queue Tail 580 can contain up to three entries, each two long words in length.

The Transmit Queue entry 160 defines the transmission parameters, as shown in FIGS. 14a and 14b, and includes two, thirty-two bit words 592, 594. Bit 29 (E) 596 of the first word 592 (FIG. 14a) is a "not end of frame" bit, which indicates that the data described by the Transmit Queue entry is part of a multi-fragment frame. Subsequent entries in the Transmit Queue Tail 580 define the remaining data for this packet. Bit 28 (F) 598 is a "do not free buffer" bit which is used by the DMA controller 74 to determine whether or not to return the buffer 180. Whether the packet buffer 180 is actually returned depends additionally upon the Buffer Used Count field 278 (FIG. 6), as described below in conjunction with FIG. 13. Bit 27 (h) 600 of the Transmit Queue entry 160 is a "do not prefix header" bit indicating whether or not to prefix the buffer contents starting at the body offset pointer 320 with the buffer contents starting at the header offset pointer 290. Bits twenty-six through twenty-four 602 define a header supplement length field indicating the number of additional bytes (written into the translation gap 298 by the FPU 40) to be transmitted with the buffer contents starting at the header offset pointer 290 as a result of frame translation. A header supplement length field value of zero indicates that no supplemental header bytes are to be transmitted. In cases where the "do not prefix header" bit 600 is set, the header supplement length field 602 is ignored, since the header portion in the buffer 180 is not to be transmitted.

Bit 22 (C) 604 is a cut-through frame bit indicating whether or not the internetworking device 10 is to begin re-transmitting the received packet 46 prior to the packet being completely received by the device. Bits twenty-one through eleven 606 define a transmit buffer number specifying the number of the buffer 180 containing the packet 46 to be transmitted, while bits ten through two 608 specify the body offset pointer 320. The remaining bits are unspecified.

Bits thirty-one through twenty-six 612 of the second word 594 (FIG. 14b) define a destination port field identifying to which of the eighteen MACs 14, 18 the transmission is to be sent. Bits twelve through zero 614 provide a packet length field specifying the number of bytes in the packet 46 to be transmitted. Note, however, the trailer portion 52 (FIG. 2) of the packet 46 is not included in the packet length field 614 since the trailer 52 is added by the transmitting MAC 14, 18. The remaining bits are unspecified.

Figure 13:
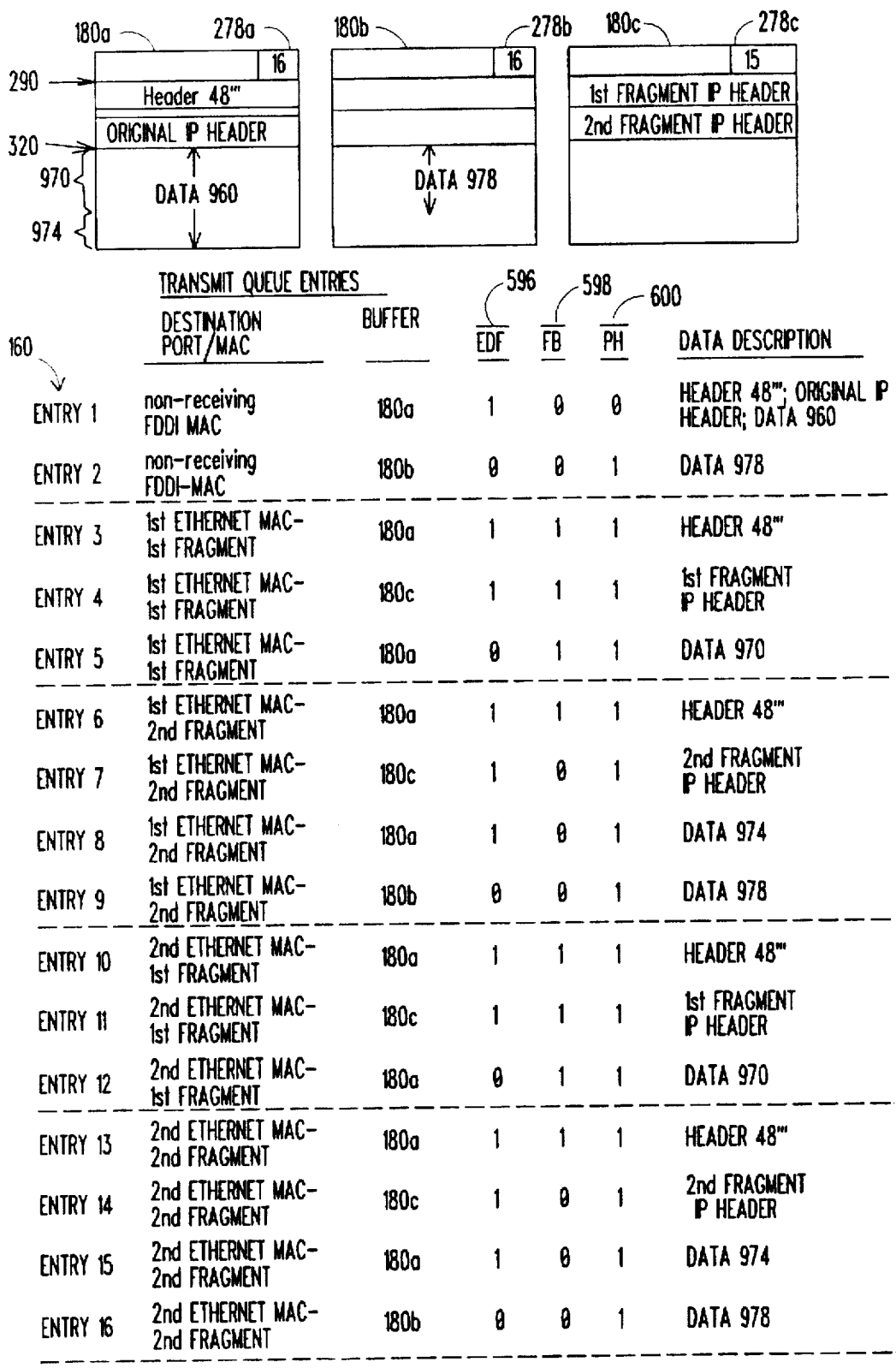
FIG. 13 shows illustrative buffers containing a received FDDI packet and Transmit Queue entries associated with multicast transmission of the packet.

Referring to FIG. 13, the operation of the Buffer Used Count field 278 (FIG. 6) and the "do not free buffer" bit 598 in the return of buffers 180 for re-use will be described in conjunction with illustrative buffers 180a, 180b and 180c. Buffers 180a and 180b contain an FDDI frame received by the BMA 22 in the manner described above. Initially, the FDDI header 48''' and a portion 960 of the received FDDI data 50''' are stored in buffer 180a. The remaining portion 978 of the received FDDI data 50''' is stored in the second buffer 180b, as shown. In the illustrative example, the received packet is intended for multicast transmission to all of the other MACs 14, 18. That is, the received FDDI data 50''' is intended for transmission to the non-receiving one of the two FDDI MACs 18 and to the sixteen Ethernet MACs 14. To this end, the Buffer Used Count field 278a, 278b of each buffer 180a, 180b, respectively, is initialized to a value of sixteen (i.e., the number of ports on which the data in the respective buffer is to be transmitted minus one), corresponding to transmission of the data contained in each of the buffers 180a, 180b by the seventeen other MACs. Buffer 180c contains Internet Protocol (IP) headers which are written during the header translation process and from which IP headers are taken when frames are fragmented for transmission, as described below. The Buffer Used Cont 278c associated with buffer 180c is initialized to a value of fifteen since the IP headers contained therein are used in the fragmented transmission of the received FDDI frame to the sixteen Ethernet MACs only (i.e., buffer 180c is not used in the transmission to the other FDDI MAC).

Also shown in FIG. 13 are selected fields with the Transmit Queue entries 160 associated with multicast transmission of the received FDDI packet. Specifically, the destination port/MAC and the buffer identifiers are depicted. Also shown in FIG. 13 are the "not end of frame" bit 596, the "do not free buffer" bit 598, and the "do not prefix header" bit 600. A "not end of frame" bit value of one indicates that the respective entry is not the last transmission of the particular frame. A "do not prefix header" bit value of one indicates that the address header stored in the respective buffer is not to be transmitted with the data specified by the respective Transmit Queue entry 160, because the packet is part of a multi-fragment frame and an IP header from buffer 180c is associated with that IP fragment transmission.

The "do not free buffer" bit 598 operates as an enable/disable bit for controlling the counter that decrements the Buffer Used Count 278. A "do not free buffer" bit value of one indicates that the buffer is not a candidate for return to the respective Free Buffer Queue 154, 157 and hence the Buffer Used Count 278 will not be decremented. If the "do not free buffer" bit 598 is zero, then the respective Buffer Used Count 278 may be decremented. The "do not free buffer" bit is zero when the buffer contents are being transmitted by the designated port (i.e., MAC) for the last time.

The first two entries in the Transmit Queue 158 correspond to transmission of the received FDDI packet to the non-receiving FDDI MAC 18. More particularly, the first entry corresponds to transmission of the data 960 from buffer 180a to the non-receiving FDDI MAC 18 and the second entry corresponds to transmission of the data 978 from buffer 180b to the non-receiving FDDI MAC 18.

In the first entry in the Transmit Queue 158, the "not end of frame" bit 596 is set, indicating that this transmission is not the end of the FDDI frame. The "do not free buffer" bit 598 on the other hand is zero, indicating that the contents of buffer 180a are being transmitted for the last time to the particular port, in this case, the non-receiving FDDI port. In response to the "not end of frame" bit 598 being zero, the Buffer Used Count 278a of the associated buffer 180a is decremented. Thus, after entry 1 in the Transmit Queue 158 is transmitted, the Buffer Used Count 278a is decremented to fifteen. Also, the "do not prefix header" bit 600 is zero indicating that the transmission of the data 960 of buffer 180a is to be prefixed with the header 48''' stored in buffer 180a.

In the second entry in the Transmit Queue 158 associated with transmission of data 978 from buffer 180b, the "not end of frame" bit 596 is zero, thereby indicating that this entry corresponds to the end of the particular frame. The "do not free buffer" bit 598 is also zero, indicating that the contents of buffer 180b are being transmitted for the last time by the non-receiving FDDI MAC 18. Thus, after entry 2 is transmitted, the Buffer Used Count field 278b associated with buffer 180b is decremented to a value of fifteen. The "do not prefix header" bit 600 is set, indicating that a header is not to be transmitted from buffer 180b.

Once the first and second Transmit Queue entries have been transmitted, the received FDDI packet is transmitted to a first one of the Ethernet MACs 14. The transmission of the received FDDI frame to the first Ethernet MAC 14 is accomplished by the transmission of two IP fragments, since the received FDDI frame is larger than a single Ethernet frame. A first IP frame fragment is transmitted to the first Ethernet MAC 14 by Transmit Queue entries 3, 4 and 5 and includes a first portion 970 of the data 960 stored in buffer 180a. A second IP frame fragment is transmitted to the first Ethernet MAC 14 by Transmit Queue entries 6, 7, 8 and 9 and contains the remainder 974 of the data 960 stored in buffer 180a, as well as the data 978 from buffer 180b.

Entry 3 begins the first IP frame fragment transmitted by the first Ethernet MAC 14 and more specifically corresponds to transmission of the address header stored in buffer 180a. More particularly, in entry 3, the "not end of frame" bit 596 is set, indicating that this transmission is not the last of the particular frame and the "do not prefix header" bit 600 is set indicating that the header stored in buffer 180a is not to be transmitted. The "do not free buffer" bit 598 is set in this case, thereby disabling the counter that decrements the Buffer Used Count 278a, since the contents of buffer 180a are not being transmitted to the first Ethernet MAC for the last time.

The fourth entry in Transmit Queue 158 corresponds to the transmission of the first fragment IP header from buffer 180c. The "not end of frame" bit 596 is set in entry 4, indicating that this transmission is not the last of the particular frame fragment. The "do not free buffer" frame 598 is set, thereby disabling the counter which decrements the Buffer Used Count 278c, since the contents of buffer 180c are not being transmitted by the first Ethernet MAC 14 for the last time. The "do not prefix header" frame 600 is also set, indicating that an address header from buffer 180c is not to be transmitted.

The transmission of the first IP frame fragment of the received FDDI frame by the first Ethernet MAC 14 is completed with the fifth entry, in which the "not end of frame" bit 596 is not set, indicating that entry 5 represents the end of the first IP frame fragment. The "do not free buffer" bit 598 is set, specifying that the contents of buffer 180a are being used for the last time for transmission by the first Ethernet MAC 14 and the "do not prefix header" bit 600 is set, indicating that no address header from buffer 180a is to be transmitted with entry 5.

Entry 6 begins the second IP frame fragment transmitted by the first Ethernet MAC 14 and more specifically corresponds to transmission of the address header stored in buffer 180a. To this end, the "not end of frame" bit 596 is set, since entry 6 does not represent the end of the particular frame fragment. Also, the "do not free buffer bit" 598 is set, thereby disabling the Buffer Used Count counter since buffer 180a is not being used for the last time by the first Ethernet MAC 14. Also, the "do not prefix header" bit 600 is set, preventing the address header 48''' stored in buffer 180a from being transmitted. Entry 7 corresponds to transmission of an IP header with this second IP frame fragment. Specifically, in entry 7, the "not end of frame" bit 596 is set since this entry is not the last of the particular IP frame fragment. The "do not free buffer" bit is not set, thereby enabling the counter that decrements the Buffer Used Count 278c associated with buffer 180c to decrement the count to fourteen, since buffer 180c is being used for the last time by the first Ethernet MAC. Also, the "do not prefix header" bit 600 is set, indicating that an address header from buffer 180c is not to be transmitted. Entry 8 corresponds to the transmission of the rest of the data 974 in buffer 180a. More particularly, in entry 8, the "not end of frame" bit 596 is set since this entry does not represent the last entry of the second IP frame fragment. The "do not free buffer" bit 598 is not set, causing the Buffer Used count 278a associated with buffer 180a to be decremented to fourteen, since buffer 180a is being used for the last time in the transmission by the first Ethernet MAC 14. The "do not prefix header" bit 600 is set, thereby preventing the address header 48''' stored in buffer 180a from being transmitted with the second IP frame fragment. Entry 9 corresponds to the transmission of the data 978 from buffer 180b and is the last entry associated with the second IP frame fragment transmitted by the first Ethernet MAC 14. Thus, the "not end of frame" bit 596 in entry 9 is not set, indicating the end of the frame fragment. The "do not free buffer" bit 598 is not set, thereby permitting the Buffer Used count 278b associated with buffer 180b to be decremented to fourteen, since this is the last time buffer 180b is used by the first Ethernet MAC.

Bits 596, 598 and 600 of entries 10, 11 and 12 are identical to like bits in entries 3, 4 and 5 and correspond to a first IP frame fragment of the received FDDI frame being transmitted by the second Ethernet MAC. Similarly, bits 596, 598 and 600 of entries 13, 14, 15 and 16 are identical to like bits in entries 6, 7, 8 and 9 and correspond to a second IP frame fragment of the received FDDI frame being transmitted by the second Ethernet MAC. In view of the above discussion, it will become apparent that the multicast transmission of the received FDDI packet requires ninety-eight additional entries in the Transmit Queue 158 which are not shown in FIG. 13 but which are identical to entries 3–9, albeit specifying the remaining fourteen Ethernet MACs.

The TFSM 620 transfers entries from the Transmit Queue Tail 580 into a Transmit Queue 158, located in the control portion 150 of the SRAM 28a, and associated with the destination MAC 14, 18. The Prefetch State Machine 242 of the DMA controller 74 polls each of the Transmit Prefetch Queues 182 to determine whether any such Queues 182 has an empty location. If any of the Transmit Prefetch Queues can accept another entry, then the Prefetch State Machine 242 polls the respective Transmit Queue 158 in accordance with the pointers stored in the respective Transmit QCB 190 and loads the next entry for transmission into the respective Transmit Prefetch Queue 182. Thereafter, the DMA controller 74 sends a request to one of the arbiters 70a, 70b for permission to access a buffer to transmit the contents thereof to the destination MAC 14, 18 associated with that queue entry. Upon the grant of such a request by the arbiter 70, the packet 46 is transmitted to the destination MAC 14, 18 under the control of the DMA controller 74.

Once the transmission is completed to the destination network, the transmitting MAC 14, 18 provides transmit status information to the TSSM 118 through the NIU 60, 62, including whether any transmission errors were encountered. Transmit status information may be monitored by the FPU 40 via a Transmit Status Queue Head 582 for statistical purposes. The Transmit Status Queue Head 582 works in similar fashion to the Receive Queue Head 560 in providing information to the FPU 40. In this case, only error transmit status from the TSSM 118 is made available to the FPU 40 via the Transmit Status Queue Head 582 for analysis.

After the data described by a Transmit Prefetch Queue Entry has been transmitted by the DMA controller 74, the DMA controller checks to see if the "do not free" bit is set in that entry. If it is, then the DMA controller 74 is done with this transmit operation. If the "do not free" bit is reset, then the DMA controller 74 passes the buffer number from the Transmit Prefetch Queue entry to the return Buffer State Machine 114. The return Buffer State Machine 114 then uses this buffer number to read the Buffer Used Count field 278 of the transmitted buffer 180. If the Buffer Used Count is at a value of zero, then the buffer 180 is returned to the respective Free Buffer Queue 154, 157 for re-use.

Upon return, the buffer's address is stored in the Free Buffer Queue 154, 157 at the location subsequent to the location indicated by the READ pointer 224, 240. Subsequent increments of the WRITE pointer 220, 236 are permitted to point to the returned buffer 180, thereby permitting the returned buffer to be once again fetched by the DMA controller 74 for inclusion in the respective Free Buffer Prefetch Queue 200.

As discussed above, if the received packet 46 has a destination address 54 of a node on a network of the same type as the source network, and if certain other criteria are met, then the RBSM 94 does not wait for the Receive Status FIFO 306 information before enqueueing the Receive Queue entry 164 (FIGS. 11a and 11b). In such a case, the packet 46 is enqueued by the FPU 40 in the Transmit Queue Tail 580 prior to the packet 46 being completely received and stored in the buffer 180.

Alternatively, it may be determined by the RBSM 94 that a received packet should not be transmitted by the device 10. In this case, the RBSM 94 provides the buffer number to the Return Buffer state machine 114, and the previously described process for returning the packet receiving buffer 180 to the Free Buffer Queue 154, 157 is repeated.

Figure 15:
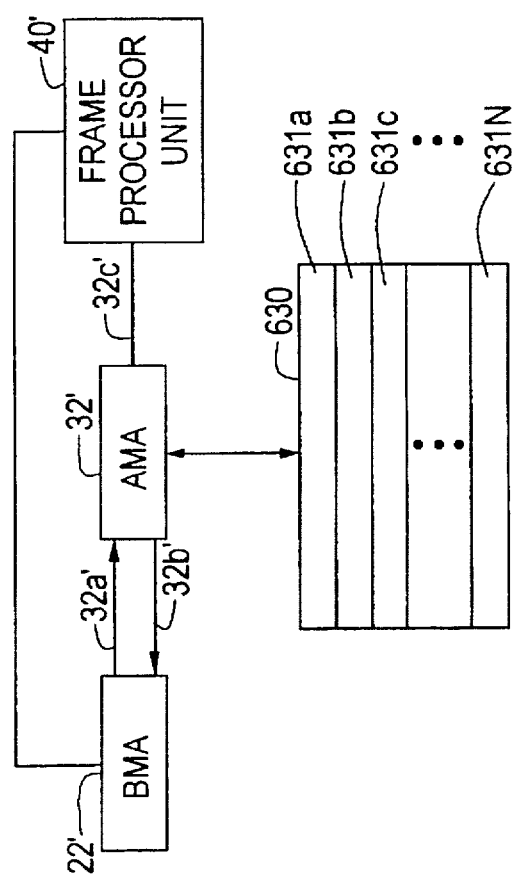
FIG. 15 is a block diagram of a portion of an internetworking device.

Referring now to FIG. 15, a portion of an internetworking device includes a BMA 22', an AMA 32' and a frame processor 40' coupled as shown and operating in a manner similar to the BMA 22, AMA 32 and frame processor 40 described above in conjunction with FIGS. 1–14. A network table 630 is stored in a portion of the AMA memory 36 (FIG. 1). The memory 36 is coupled to the AMA 32'. The network table 630 has a plurality of entries 631a–631N generally denoted 631. Each of the entries 631 contain the same information as entry 344 described above in conjunction with FIG. 7. Additionally, the entries 631 may each have the same format as the entry 344. Other frame formats selected to be compatible with the AMA 32' may of course also be used.

The AMA 32', under control of the frame processor 40', maintains the network address table 630 within a dedicated portion of the random access memory (RAM) 36 (FIG. 1). Each entry 631 in the address table 630 includes a predetermined number of bits in which a network address is stored. Each entry 631 also has a predetermined number of bits in which tag and data information associated with the address are stored. As network addresses are learned by the system, they are stored as entries 631 in the address table 630. Each of the entries 631 in the network table 630 contains only the information shown in FIG. 7. The AMA 32' and the network table 630 thus form a cache-like device. Accordingly, the network address table 630 may also be referred to as an address cache memory 630 or more simply an address cache 630.

The BMA 22' receives frames via the ports of the internetworking device and feeds the source and destination addresses from the received frames to the AMA 32' on an input port 32a'. Upon receipt of the addresses, the AMA 32' searches the address cache 630 for such addresses and determines whether they are stored in the address cache 630. After the search is complete, the AMA 32' provides the results of its address look-up operation to the BMA 22' on port 32b'.

In one embodiment, AMA 32' uses a binary search technique to rapidly determine whether or not the source and destination addresses are stored in the address cache 630. This binary search technique requires that addresses be stored in the AMA address cache 630 in ascending order.

If the AMA 32' locates a destination address in the address cache 630, then that address is already known to the internetworking device and the AMA 32' can provide to the BMA 22' state and data information associated with the address. For example the AMA 32' can provide information such as the port on which the address was dynamically learned or statically configured and through which the address can currently be reached. The AMA 32' provides the data associated with addresses stored in the address cache 630 as inputs to the BMA 22' to facilitate the processing of a received frame.

If the search for a source address in the address cache 630 is unsuccessful, then the address is currently unknown to the bridge and the address is installed as an entry in the address cache 630. A successful or unsuccessful search of the AMA address cache 630 for a particular address is referred to as an AMA address cache hit or miss, respectively.

The AMA 32' stores the address cache 630 data as provided by the frame processor unit 40', as discussed subsequently. If the source address of a frame is not already stored in the address cache 630, then it is assumed that the origin of the frame was on the network segment attached to the system port through which the frame was received. It is thereby deduced that particular network address can be accessed through that particular system port. The address is consequently associated with that system port and such association is recorded as part of the entry 631 for that address. If the source address of a frame is already stored in the address cache 630 then the port on which the address was learned may be cross-checked against the port on which the current frame was received. Thus, the movement of network addresses (actually the stations which own the addresses) between ports can be identified and the address cache data corrected.

The AMA 32' also monitors the access frequency of addresses stored in the address cache 630. If an address stored in the address cache 630 has not been the subject of a cache hit for a predetermined period of time, then the address is considered stale and may be removed from the address cache 630 to make room in the address cache 630 for addresses which have been recently accessed The process of removing from the address cache 630 stale addresses to ensure that only recently accessed addresses are stored in the address cache 630 is generally referred to as aging.

With this particular technique, the AMA 32' maximizes the number of recently used entries stored in the address cache 630. Once a network address ceases to source frames and such address is removed from the address cache 630, the address must be reinstalled in the address cache 630 if and when the address again begins sourcing network frames.

As described in detail above in conjunction with FIG. 7, to implement the aging technique, each entry in the address cache 630 includes a bit corresponding to a so-called seen or age flag. When the AMA 32' locates a source address in the address cache 630, the seen flag for that particular address is set. The frame processor 40' periodically polls the seen flags of all active entries in the address cache 630 and resets the seen flags for address entries 631 that have been seen and removes entries 631 for dynamic network addresses which have not been seen within a specified period and thus should be aged-out of the address cache 630.

It should be noted, that except for the seen flag, the AMA 32' does not modify the entries 631 in the address cache 630. The AMA 32' relies instead on the frame processor 40' to maintain the address cache 630. The frame processor 40' is thus primarily responsible for assuring that the entries 631 of the address cache 630 are correct. Thus, when appropriate, entries 631 are installed in, modified or removed from the address cache 630 under the control of the frame processor 40'.

Assuming the source and destination addresses are provided as 48-bit addresses, the AMA performs full 48-bit comparisons when searching for destination addresses in the address cache 630. The AMA, however, masks off the high order bit that indicates source route bridging when performing source address searches in the address cache. That is, the AMA performs forty-seven bit comparisons during source address look-up operations. In this particular embodiment, the source routing bit corresponds to bit 48 of the address.

In order to determine whether a received frame is destined for transmission on the same port as it was received (i.e., same segment traffic), the BMA 22 is provided with information regarding the port associated with a stored destination address by the AMA 32'. If the BMA 22 determines that the port number stored as part of the entry for that particular destination address is the same as the port on which the frame was received, then this indicates that both the destination and source stations are on the same network segment. That is, the frame is so-called same segment traffic meaning that the source and destination addresses are on the same port. If the frame involves same segment traffic, then the frame does not need to be bridged. That is, the frame can be discarded or filtered by the BMA 22'.

On the other hand, if the port number associated with the destination address differs from the port number on which the frame was received, then the BMA 22' will not filter the frame. Rather, the frame will be bridged to the port associated with the specified destination address.

In addition to searching the address cache 630 for the destination and source addresses of received frames, the AMA 32' also performs several port comparisons associated with hits in the address cache 630. If the source address is found in the address cache 630 (i. e. a cache hit), then the AMA 32' compares the known (associated) port of the address to the actual system port on which the frame was received. If the ports are not equal, then the address may have moved on the network and special processing of the frame by the BMA 22 may be required.

The AMA 32' provides the results of the network address look-up operations, the tag and data associated with known addresses and the results of the known address port comparisons to the BMA 22' on a per frame basis. The BMA 22' uses this information for pre-processing of the received frame. The BMA 22' places the information received from the AMA 32' into a receive frame buffer so that this information can be used by the frame processor 40'.

In one embodiment, the AMA address cache 630 is provided from a dedicated area of a static random access memory (SRAM) and can have stored therein up to 8192 (8K) eighty bit entries. Those of ordinary skill in the art will recognize that other types and sizes of memories may be employed. The entries may also be provided with greater or fewer than eighty bits of information.

In one embodiment, the AMA 32' utilizes a binary search technique to search for addresses stored in the address cache 630. To ensure proper operation of the binary search method, entries 631 in the address cache 630 are placed in ascending order according to network address. It should be noted that in some embodiments it may be possible to place the addresses in the address cache in descending order, however, in this event the search routine must be accordingly modified.

As mentioned above, the frame processor 40' is responsible for maintaining the network address list in proper order within the address cache. To accomplish this task, the frame processor 40' maintains its own representation of the ordered list of network addresses on the address cache 630. Thus the frame processor 40' contains a software version of the network address table with which the FPU directs, installs and removes operation in the address cache.

In an embodiment where the address cache entries are eighty bits long, the frame processor unit 40' installs seventy-eight bits of information in the address cache 630. The seventy-eight bits of information are provided as forty-eight bits of network address, fourteen bits of tag information and sixteen bits of data associated with the network address generally referred to as associated data. The frame processor decides how particular ones of the tag and associated data bits should be set based on a particular operation to be performed.

The addresses typically stored in the AMA address cache 630 are the unicast addresses of stations attached to the network segments connected to the system's physical ports. These addresses are referred to as external addresses.

So-called internal addresses can also be stored in the address cache 630. Internal addresses refer to the addresses of logical ports within the system. Frames destined for internal addresses must be delivered to the bridge applications which support them.

Internal addresses can be unicast addresses, such as the MAC address of the bridge port, or multicast addresses for management applications, for example. The broadcast address is also supported as an internal address so that it may be uniquely identified and processed from multicast addresses. The AMA address cache 630 can identify individual addresses as internal addresses and thus provides means for the BMA 22' and AMA 32' to specially process frames having such addresses.

As discussed above and as explained in conjunction with FIG. 7, each entry 631 in the AMA address cache 630 contains multiple fields of information. The network address field (denoted mem_net_adr in FIGS. 15–21) of the address cache entry is compared with the destination and source addresses of received frames. When the frame processor 40' establishes an entry 631 in address cache 630, the frame processor 40' assigns a tag field (denoted mem_net_tag in FIGS. 15–21) to the entry. The tag field is subsequently used by the frame processor 40' to quickly cross-match entries in the AMA address cache 630 to the corresponding network address record in the bridge address table of the frame processor 40'. The tag field is also used to identify original and copied addresses generated in the address cache 630 when address entries are being installed or removed from the address cache 630.

That is, during an install or remove operation it is possible that the address cache will contain two copies of an address entry. The tag is used to identify which entry is to be used in the address cache 630. In one embodiment, the address cache 630 has a maximum of 8192 entries. The tag, however, is provided as fourteen bits from which 16384 tag identifiers are available for use. Thus in this particular example two times the number of tag identifiers are available to be used to identify particular ones of the address entries in the address cache 630. By having twice as many tag identifiers as entries 631 in the address cache 630, it is not necessary to keep track of which tag identifiers have been used. The particular number of tag identifiers used, however, should be selected to ensure that the tags correctly and uniquely identify each of the entries in the address table 630.

When the network address is inserted into the cache memory 630, the frame processor 40' also assigns a data field mem_net_dat associated with the address. Unique bits within the data field identify (1) the address entry type (e.g., broadcast, multicast or unicast), (2) whether the address is external or internal, (3) whether the address is dynamic or static, and (4) whether the address belongs to a filter group. The associated data field also contains the port (physical or logical) number currently associated with the network address.

The associated data is provided to the AMA 32' by the frame processor unit 40' at the time the address and associated data information is installed in the address cache 630. The frame processor unit 40' either generates the data internally or the data is set outside of the frame processor unit 40' and simply provided to the AMA 32' by the frame processor unit 40'.

In addition to the fields discussed above, the AMA address cache entry 631 also contains the seen or age bit. The seen bit is the only portion of an address cache entry 631 that is modified by the AMA 32' without direct instruction from the frame processor 40'. The AMA 32' sets the seen bit of an address cache entry 631 if the associated address corresponds to a source address of a received frame.

Each address cache 630 entry provides three types of information. First, some bits of each entry represent information returned to the BMA to allow the BMA to correlate results returned from the AMA to a particular address search request provided from the BMA to the AMA. Such information represents a buffer number, in an illustrative embodiment. Second, some bits of each entry are provided from the AMA memory. Third, some bits of each entry are set by the AMA in response to compare operations performed by the AMA between information stored in the address cache and information which the BMA provided to the AMA.

Figure 16:
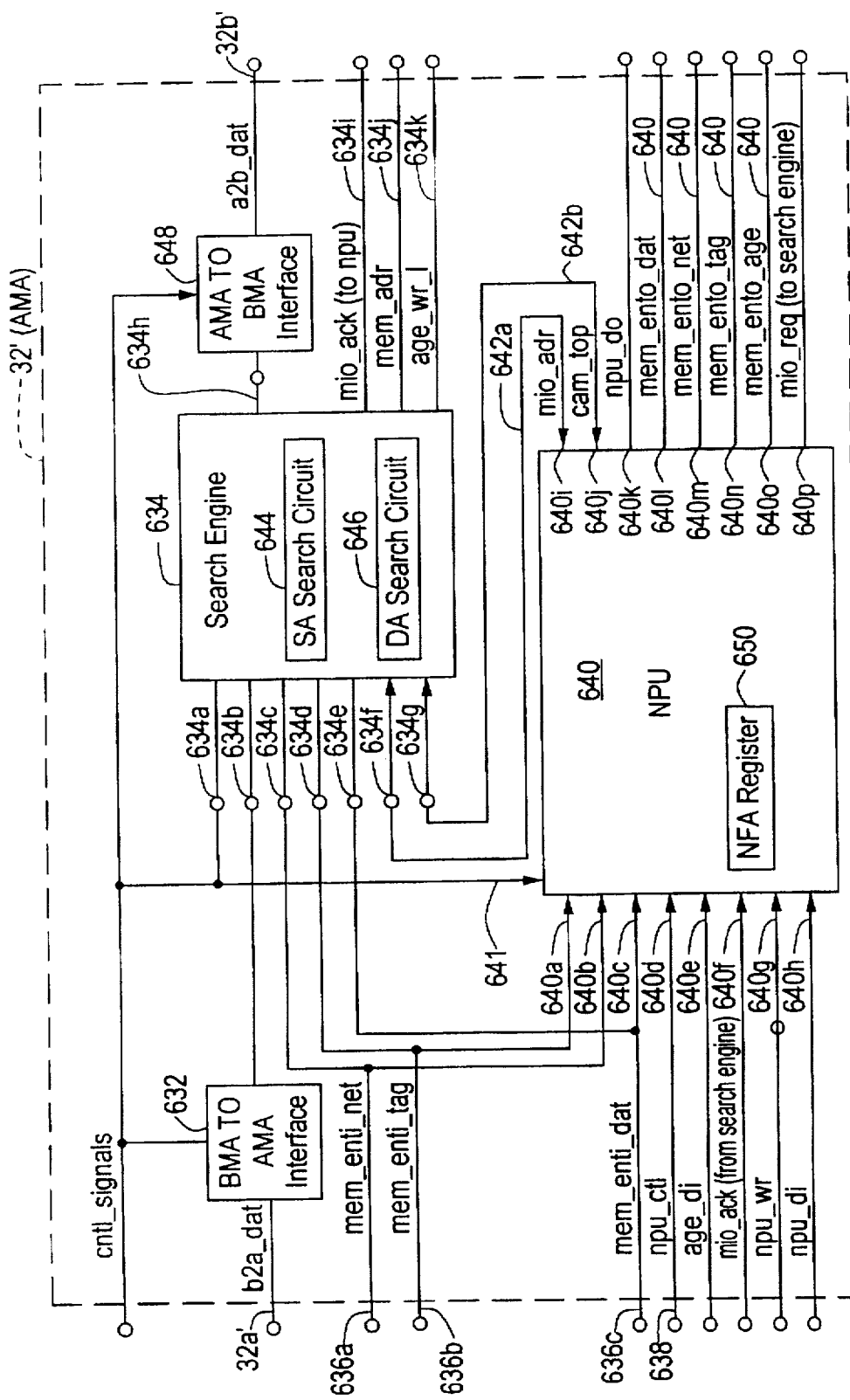
FIG. 16 is a block diagram of an address management circuit.

Referring to FIG. 16, the AMA 32' includes a BMA-to-AMA interface circuit 632 having a first signal path coupled to terminal 32a' of the AMA 32'. The BMA-to-AMA interface circuit 632 is adapted to receive source and destination addresses from the BMA 22' (FIG. 15) in signal b2a_dat and provides the data signal b2a_dat to a search engine 634 at a terminal 634b.

The BMA to AMA interface circuit is a state machine which through which data is provided from the BMA to the AMA eight bits at a time. Similarly, the AMA returns data to the BMA eight bits at a time through the AMA to BMA interface circuit.

Control signals coordinate the interchange of data between the AMA and the BMA in both directions. For example, control signals include begin and ready signals which are passed between the AMA input and the BMA output and the AMA output and the BMA input. The ready and begin signals are used to synchronize the AMA and BMA to allow data to be passed between the two circuits.

For example, to return search results to the BMA, the AMA waits to receive a ready signal from the BMA. In response, the AMA returns a begin signal, and which causes the BMA to accept the search results from the AMA eight bits at a time.

Network address, tag and data information mem_enti_net, mem_enti_tag, mem_enti_dat are coupled from AMA input terminals 636a, 636b and 636c to the search engine 634 at input ports 634c, 634d and 634e respectively. The primary function of the search engine is to read addresses from the AMA cache memory 630 and compare the addresses read from the address cache 630 to the addresses fed to the AMA 32' from the BMA 22'. The AMA 32' also receives control signals cntl_signals (e.g. clock, chip select, address signals) and as described below, provides signals to the search engine 634 at terminal 634a.

One problem which arises in the AMA is that two searches must be done to determine whether the source and destination addresses are stored in the cache 630. That is, a first search is done to locate the source address (SA) in the address cache 630 and a second search is done to locate the destination address (DA) in the address cache 630. Thus the search engine 634 includes a pair of parallel search circuits 644, 646 to concurrently search for the source and destination addresses.

It should be noted that the designation of search circuit 644 as the SA search circuit and circuit 646 as the DA search circuit, is arbitrary and not intended to be limiting. Each of the circuits 644, 646 should be capable of comparing source and destination addresses received from the BMA 22' with addresses retrieved from the address cache memory 630. Thus the SA search circuit 644 and DA search circuit 646 concurrently perform searches for source and destination addresses in the address cache 630 (FIG. 15).

The search engine 634 receives the information fed thereto on input ports 634b–634g and provides the results of its address look-up operations at an output terminal 634h which is coupled to an AMA-to-BMA interface circuit 648. Interface circuit 648 returns the AMA search results in signal a2b_dat to the BMA 22' at output terminal 32b' of the AMA 32'. The search engine 634 also provides output signals mio_ack, mem_adr and age_wr_1 on output ports 634i–634j.

Output signal mio_ack corresponds to an acknowledgement signal fed to a network processor unit (NPU) 640 at a terminal 640f to indicate whether or not a memory input/output (I/O) request from the NPU 640 is accepted. Signal mem_adr corresponds to an address stored in the address cache 630 and signal age_wr_1 indicates whether the age bit is to be modified or not.

The address, tag and data signals mem_enti_net, mem_enti_tag, and mem_enti_dat are also fed to the network processor unit (NPU) 640 at input ports 640a, 640b, and 640c respectively. The NPU 640 directs install and remove operations and thus reads information from and writes information to the address cache 630. The NPU also receives control and age signals npu_ctl, age_di at terminals 630d, 640e.

The NPU 640 includes a next free address (NFA) register 650. The NFA register 650 contains the address of the next free address in the network table 630 (FIG. 15). Thus if the first ten memory addresses in the network table 630 have entries 631 stored therein for example, then the NFA register 650 would be set equal to eleven.

The NPU 640 is also coupled to the search engine 634 via a pair of signal paths 642a, 642b. An address mio_adr is fed from NPU 640 along signal path 642a and coupled to terminal 634f of the search engine 634. The address mio_adr corresponds to a memory address which the NPU 640 desires to access to perform some memory input-output operation. The NPU 640 issues a memory access request mio_req to the search engine 634 on line 640p. The memory access request to access address mio_adr must be accepted by the search engine 634 before the NPU 640 can actually perform the desired memory I/O operation. In some instances, the NPU memory access request can be performed during a search cycle as will be described in conjunction with FIG. 21 below.

The search engine 634 includes circuitry which selects which address is provided as signal mem_adr from terminal 634j of the search engine 634. There are thus three sources of addresses which are provided to the search engine 634: (1) the SA search memory address (2) the DA search memory address and (3) the mio_adr from the NPU 640.

The NPU 640 provides the next free address information cam_top to the search engine 634 on signal path 642b. The search engine 634 uses the next free address information to determine an ending address in performing the search. Thus, address and address cache information flow between the search engine 634 and NPU 640 on signal paths 642a, 642b in response to install or remove operations.

As mentioned above, the AMA search circuits 644, 464 implement a binary search algorithm in searching the address cache 630. Thus a particular address is found in the address cache 630 by first selecting an address which is midway between an initial address and ending address in the address cache 630 and determining whether the searched for address is larger than, smaller than or equal to the midpoint address value. If the searched for address is larger than the midpoint address then the next sequential address in the address cache 630 (either above or below the midpoint value) is used as a new beginning point, and another address is used as an end point. A new midpoint value between the beginning and ending addresses is then selected.

The step of the determining whether the desired address is larger or smaller than the midpoint address is then repeated. These steps are continuously repeated in the search circuits 644, 646 until the desired address is either found or it is determined that the address which is being searched for is not contained in the address cache 630. Thus, search circuits 644, 646 each include means for holding a current beginning address, a current midpoint address and a current end point address during the search process. Each of these values may of course be modified during the search.

As will be described in detail below in conjunction with FIG. 18, the NPU 640 also provides output signals npu_do, mem_ento_dat, mem_ento_net, mem_ento_tag, mem_ento_age and mio_req at corresponding ones of output terminals 640k–640p as shown.

When the AMA 32' receives a network address from the BMA 22', the BMA 22' also provides a port number given over the BMA-to-AMA interface 632 that indicates the number of the port on which the BMA 22' received that particular source address. As explained above, the port number stored as part of the entry for that particular source address in the address cache 630 indicates the port number on which the address was learned. These two port numbers are compared and a status bit is returned to the BMA in the signal a2b_dat. The status bit indicates whether the port numbers match or not. If the port numbers match, then the address is same segment traffic.

As mentioned above, the AMA 32' is provided the port number, the buffer number, the destination address and the source address. In FIG. 7, the port number portion of the frame indicates the port number on which the address was received. Since several searches may be occurring, it is necessary for the AMA 32' to return to the BMA 22', along with the lookup results, the port number on which the address was received. The AMA 32' also returns the address and buffer number initially given to the AMA 32' by the BMA 22' so that the BMA 22' can correlate the AMA 32' provided information with a particular BMA request.

In addition to the above-mentioned correlation information returned from the AMA 32' to the BMA 22', the AMA 32' also provides in signal a2b_dat an indication of whether or not a particular source address or destination address was found. Furthermore, for both the source and destination addresses, the AMA 32' compares the port number the BMA 22' sent to the AMA with the port number stored in memory for each of these 48 bit addresses. The AMA 32' returns the results of this comparison to the BMA 22' in a series of bytes so that the BMA 22' can tell whether the frame is same segment traffic or not.

If the destination address and source address are on the same physical port, this indicates that the frame is same segment traffic. Since stations which are on the same physical port necessarily receive each others transmit traffic, the destination station is receiving the frame at the same time the BMA receives the frame. Thus as soon as it can be determined that a frame's destination address and source address reside on the same port, the BMA can discard the frame since the destination station already has received the frame.

The network table 630 may be provided as either and 8K by 78 bit network table or a 128K×100 bit network table, in two illustrative embodiments. In the case where the table is 128K×100 100 bits, the signal mem_ent_dat is provided as 32 bits (vs. 16 bits when the network table is provided as an 8K×78 bit network table) and the mem_ent_tag signal is provided as 17 bits (vs. 14 bits in an 8K×78 bit network table).

Figure 17:
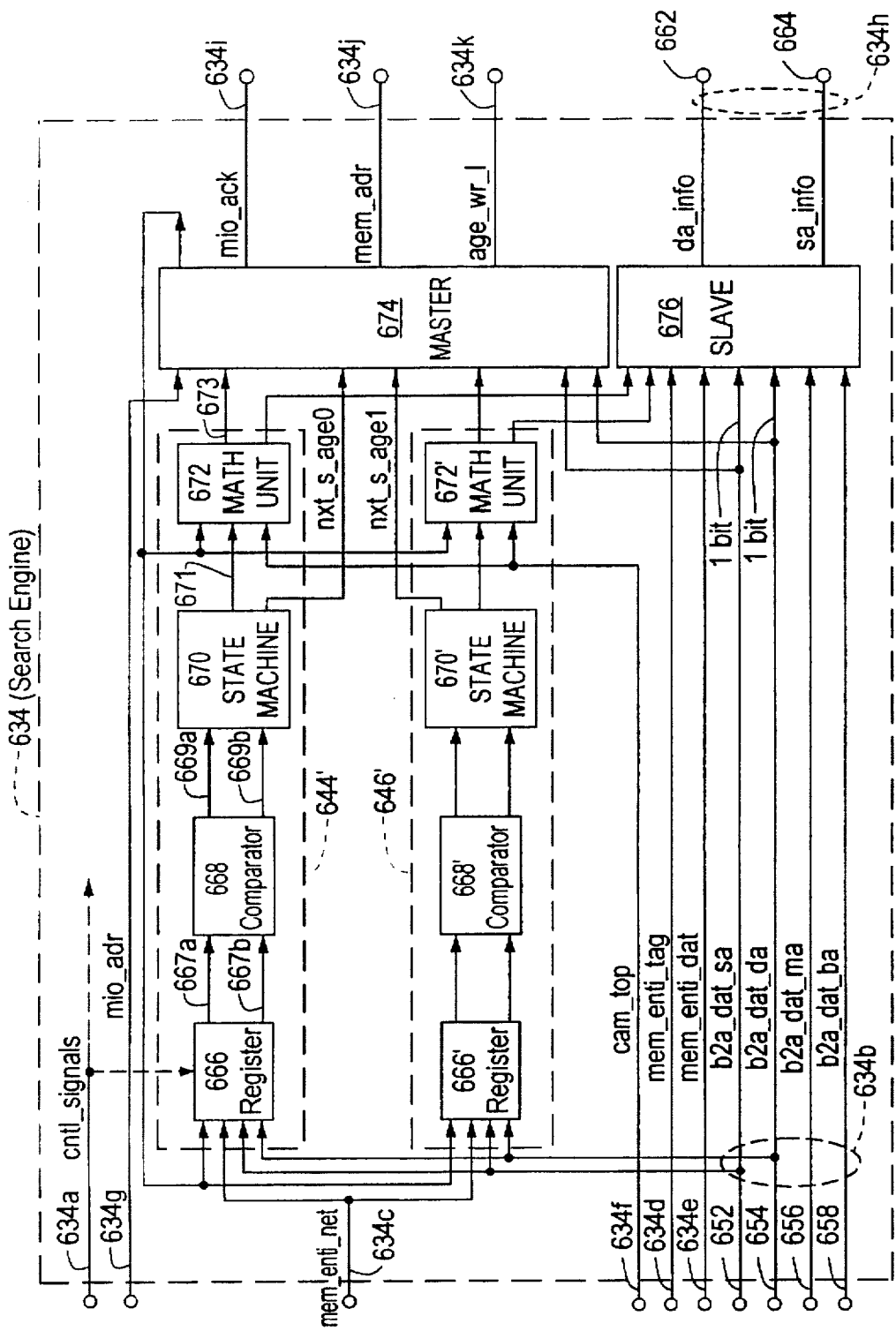
FIG. 17 is a block diagram of a search engine.

Referring now to FIG. 17, the search engine 634 receives control signals, address information and address cache information on input ports 634a–634g as described above in conjunction with FIG. 16. It should be noted that FIG. 17 is a functional block diagram which gives one of ordinary skill in the art the functional information needed to design and fabricate circuits which can implement the functions described herein.

It should also be noted that the signal provided from the BMA 22' to the AMA 32' through the BMA-to-AMA interface 632 on input line 634b of AMA 32' (FIG. 16) is here shown sub-divided into signal lines 652–658 on which source address, destination address memory address and the buffer number from the BMA to AMA are respectively provided as signals b2a__dat__sa, b2a__dat__da, b2a__dat__ma and b2a__dat__ba. The BMA passes the buffer number to the AMA as signal b2a__dat__ba so that the AMA may return this buffer number along with the lookup results so that the results provided by the AMA can be correlated to a particular BMA request.

In general overview, the search engine 634 receives address information from the BMA 22' and the NPU 640 and searches the address cache 630 (FIG. 15) to determine if the source and destination addresses are stored therein. The search engine 634 receives on signal paths 652, 654 source and destination addresses b2a__dat__sa, b2a__dat__da from the BMA 22'. On signal path 634c an address mem__enti__net is fed from the address cache 630 to the search engine 634.

The search engine 634 includes a pair of parallel computation or search circuits 644', 646' in which computations are made to search the address cache for source and destination addresses. The address signal mem__enti__net is fed along a pair of signal paths to the inputs of a like pair of parallel search circuits 644', 646'. The parallel search circuits 644', 646' operate in a manner similar to the search circuits 644, 646 described above in conjunction with FIG. 16.

Each of the search circuits 644', 646' can search the address cache 630 for either a source address (SA) or a destination address (DA). As a result of the searches, the search engine 634 returns source address and destination address information on lines 662 and 664 which were represented as output 634h of the search engine 634 in FIG. 16.

In more detail now, and taking search circuit 644' as representative of search circuit 646', the address mem__enti__net retrieved from the address cache 630 is fed to a first terminal of a register 666. A first one of a source or a destination address b2a__dat__sa, b2a__dat__dat provided from the BMA 22' and for which the AMA 32' is searching is selectively fed to a second terminal of the register 666. That is, since each of the search circuits 644', 646' can search for either a source or a destination address then either one of the source and destination addresses can be fed to either of the search circuits 644', 646'.

The register 666 feeds a pair of addresses to inputs of a comparator 668. Thus the comparator 668 receives on one input terminal the source or destination address provided from the BMA 22' (i.e. the address which is being search for) and on the second input terminal, the comparator 668 receives the network address mem__enti__net that has been retrieved from the address cache memory 630.

In one embodiment, the comparator 668 may be provided as a 48 bit comparator which performs a 48 bit compare operation. Thus comparator 668 can compare a first 48 bit address (e.g. the address read from memory) with a second 48 bit address (e.g. the address provided by the BMA 22'). The second address may correspond to either a source address b2a__dat__sa (i.e. the source address received from the BMA 22') or to a destination address b2a__dat__da (i.e. the destination address received from the BMA 22').

The comparator 668 is coupled to a state machine 670 via a pair of signal paths 669a, 669b. The signal paths 669a, 669b take on values which depend on the result of the comparison. Thus the comparator output signals indicate to the state machine 670 whether the state machine should search addresses higher or lower in the address cache 630 or whether there has been a cache hit.

In response to the comparator output signals, the state machine 670 provides a signal along signal path 671 to a math unit 672. For example, one output value from the state machine 670 may indicate to search a first portion of the address cache 630, a second output value from the state machine 670 may indicate to search a second different portion of the address cache 630 and a third output value from the state machine 670 may indicate that there has been an address cache hit.

The signal from the state machine 670 along signal path 671 indicates to the math unit 672 in which direction the math unit should move the values to search for the address which is being sought. The state machines 670, 670' also respectively provide signals nxt__s__age0, nxt__s__age1 to the master 674. The signals nxt-__s__age0, nxt__s__age1 indicate whether an age bit of an entry 631 in the address cache 630 should be set via the signal age__wr__1 on output terminal 634 k of the search engine 634.

The math unit 672 has the begin point, end point and midpoint values of the searched addresses of the network table 630 stored therein. Thus, in response to the signal provided from the state machine 670 the math unit 672 changes two of the begin point, end point and midpoint values to thus narrow the search to a smaller range of addresses within which the address being searched for should be found if it is stored in the address cache 630. The signal cam__top is fed to the math units 672, 672' and the math units 672, 672' use the cam__top signal to determine the next free address in the memory 630.

In one embodiment, the math unit 672 performs a binary search. Upon completion of one compare cycle in the binary search the state machine 670, in response to the comparator output signal, instructs the math unit 672 to next search addresses higher or lower than the address previously fed to the comparator 668 from the memory 630.

The math unit 672 is coupled to a master 674 through a signal path 673. The master 674 determines which device will next have access to the memory 630.

As will be described in detail in conjunction with FIGS. 20 and 21 below, the master 674 also interleaves memory accesses between the source and destination address searches which are proceeding concurrently in the search circuits 644' 646' as well as the memory accesses for the addresses mio__adr provided from the NPU 640 (FIG. 16) on input port 634g. Thus at any clock cycle, the master 674 could either use the address mio__adr provided from the NPU 640 on line 634g, the address coming out of math unit 672 or the address coming out of math unit 672'.

Each of these three addresses are available to the master 674 and are fed out of the master 674 on output line 660 as signal mem__adr. Thus the master 674 conducts a three way arbitration to determine which memory request will be next given access to the address cache memory 630. Thus, the master 674 determines which devices have access to the memory.

The tag and data signals mem__enti__tag and mem__enti__dat are not required in performing the compare operation. Thus the tag and data signals mem__enti__tag, mem__enti__dat associated with the address are fed directly to slave 676.

As mentioned above, the search engine 634 performs two concurrent searches to determine if the source and destination addresses provided by the BMA 22' are present in the address cache 630. If the address is found in the address cache 630 (i.e. a cache hit), the tag and data information mem__enti__tag and mem__enti__dat are delivered back to the BMA 22' along with information indicating where the mem__enti__tag and mem__enti__dat information was found. The tag and data information as well as the index where the information was found are provided by the slave 676 at output ports 662, 664 as signals sa__info, da__info. The da__info and sa__info signals are then sent to the BMA 22'.

If the source address is not found in the address cache 630, the tag field is set to the memory address of the memory location where that network address should be installed (i.e where the address should have been found in the network table). This tag field can be made invalid if there are other install or remove operations in progress at the time of the search.

That is, if a shuffle operation is in progress at the time the search is finished, the midpoint address could change between the time the correct install point is determined and the time the install point is provided to the FPU. This means that the install point provided by the AMA to the FPU may not be correct. Thus the FPU uses the information provided by the AMA and treats the information as a best estimate (rather than as a final result) as to where this network address should be installed.

For example, assume the AMA 32' (i.e. the search engine) completes a search but does not find the source address in the address cache 630. Upon completion of the search, the AMA contains information identifying the address cache location at which the address should have been stored had it been in the address cache 630. While this information is stored in the AMA it could become invalid since a shuffle (i.e. an address install operation or an address remove operation) could be taking place via the NPU. Thus upon completion of the search, another address could, for example, be installed in the address cache 630 and this would make the information stored in the AMA incorrect with respect to the location at which the address should be installed in the address cache 630. Since two operations can occur concurrently (i.e. the end of the search and the completion of an install), the FPU software cannot rely solely on the information provided thereto by the AMA.

Since the AMA 32' may receive a request from the BMA 22' on either an odd clock cycle or an even clock cycle, either one of the two parallel search circuits 644', 646' could be searching for a source or a destination address. Thus as mentioned above, the search circuits 644', 646' are not dedicated to searching either source or destination addresses but rather on each clock cycle either of the search circuits 644', 646' may search for either a source or a destination address.

A signal path 675 coupled between the master 674 and registers 666, 666' indicate whether a BMA request was received on an odd or an even clock cycle. It is important to indicate whether an even or an odd clock cycle is occurring since, as will be described in detail below in conjunction with FIGS. 20 and 21, the source and destination addresses must be registered into the search circuits 644' 646' at predetermined points in time. Suffice it here to say that in preferred embodiments, the SA search is initiated before the DA search. Since the search circuits 644', 646' access memory on opposite clocks (e.g. circuit 644' access memory on even clock cycles and circuit 646' access memory in odd clock cycles) the master 674 determines whether the address is loaded into register 666 or register 666' depending upon whether the request was received on an odd or an even clock cycle. Thus the master 674 interleaves the memory accesses of the search circuits 644', 646'.

As will be described in conjunction with FIG. 18a below, in some embodiments the address cache 630 is divided into a network address portion and an internet protocol portion. In such an embodiment, a signal nw__upper__bound is fed from the NPU 640 (FIG. 18) to an input port 635 of the search engine 634 and subsequently to the math units 672, 672'. The signal nw__upper__bound indicates to the math units the highest address in the network address portion of the address cache 630. The lowest address of the address cache 630 is assumed to be zero.

Figure 18:
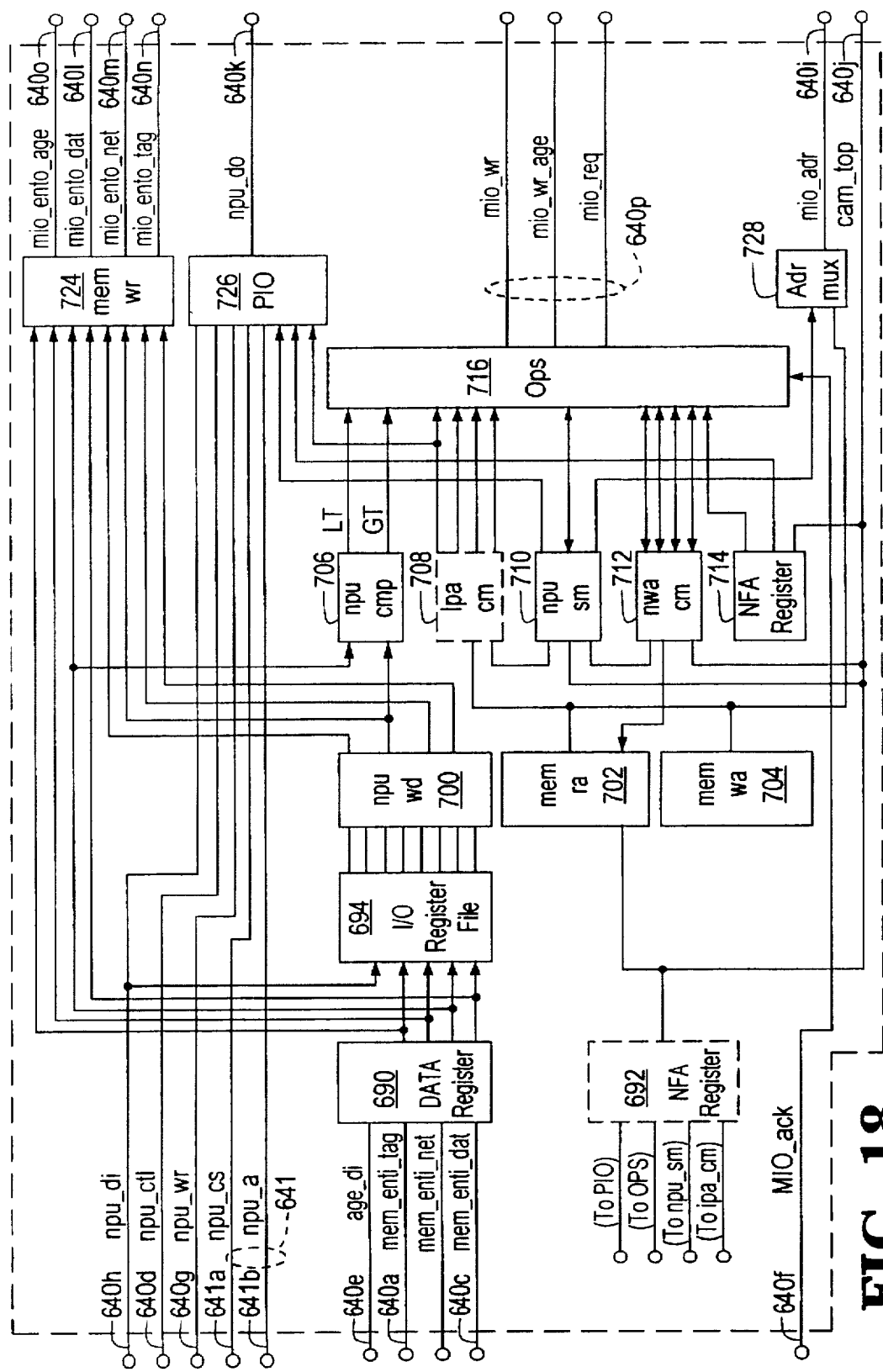
FIG. 18 is a diagrammatical view of a memory.

Referring now to FIG. 18, the NPU 640 is provided having the plurality of input ports 640a–640h and 641 and a plurality of output ports 640i–640p. It should be noted that the control signals cntl__signals fed to port 641 of the NPU 640 as shown in FIG. 16 are shown in FIG. 18 as being fed to the NPU 640 on signal paths 641a, 641b.

In general overview, the NPU 640 receives input-output (I/O) requests from the frame processor 40' (FIG. 15) and reads and writes information from the address cache memory 630 (FIG. 15) in response to instructions from the frame processor 40'. Thus, the NPU 640 can receive an instruction or an address via software from the frame processor 40' and read and/or write information to/from address cache memory 630 in response to the frame processor software instructions. Thus to perform an install or remove operation, for example, the frame processor 40' issues an install or remove instruction to the NPU 640.

A programmed input-output (PIO) processor 726 receives data input signals npu__di, control signals npu__ctl, read/write signals npu__wr, chip select signals npu__cs and address signals npu__a at input ports 640h, 640d, 640g, 641a and 641b respectively from the frame processor 40'. In this particular embodiment, the address signal npu__a is provided by the frame processor 40' as four address bits. The address bits specify which one of sixteen locations inside the AMA 32' the frame processor 40' desires access to.

The data received from the frame processor 40' npu__di is received on port 640h. The control signal npu__ctl received on port 640d indicates whether the NPU 640 is performing a control operation or a data operation. Data information is that information which is to be written to (or has been read from) the address cache 630. Control/status information, on the other hand, denotes information such as whether the network address table is full or empty, whether the AMA is busy or has finished searching, what the next free address is, the status of the control registers and the like.

The write signal npu__wr indicates whether the frame processor 40' is performing a read or a write operation to the AMA. The chip select signal npu__cs indicates whether or not this particular system cycle is dedicated to the AMA 32'.

The PIO processor 726 receives each of the signals npu__a, npu__ctl, npu__wr, npu__cs and in response to the input signal, the PIO processor 726 forwards the request to an operations processor (OPS) 716 which interfaces with the search engine 634 (FIGS. 16, 17) to implement the operation. Thus, the PIO processor 726 responds to the four signals fed thereto npu__a, npu__ctl, npu__wr, npu__cs and determines the information to be provided to the frame processor 40' as data output signal npu__do at output port 640 k.

As mentioned above and as will be described in further detail below in conjunction with FIG. 18a, in some embodiments the address cache 630 is provided having a network address region, and an internet protocol (IP) region. In this case, the PIO 726 includes three bounds registers 726a, 726b, and 726c. Bounds register 726a corresponds to an nw_upper_bound register in which is stored the highest address of the network address portion of the address cache. The lowest address of the network address portion of the address cache is assumed to be zero.

Bounds register 726b corresponds to an ipa_lwr_bound register in which is stored the lowest address of the IP portion of the address cache 630. Bounds register 726c corresponds to an ipa_upper_bound register in which is stored the highest address of IP portion of the address cache 630.

The number of bits of the data output signal npu_do provided to the frame processor 40' depends in part upon the size of the address cache 630. For example, if the address cache 630 is provided having 8 K entries, the signal npu_do preferably includes sixteen bits to identify addresses within the address cache 630. However if the address cache 630 is provided having 128 K entries, the signal npu_do preferably includes seventeen bits to identify addresses in the address cache 630 to thus allow each of the addresses in the address cache 630 to be accessed in a single read or write cycle.

The operations processor (OPS) 716 is a state machine that performs all of the install and remove operations. The processor 716 loads values into various registers and determines whether a memory read address or a memory write address is provided on line 640p. Thus, the operations processor 716 controls the operation of the NPU 640 by determining which ones and at what times the plurality of registers are loaded or whether a write cycle or a read cycle is performed.

The operations processor 716 is a state machine which is the focal point of the install and shuffle operations. The operations processor 716 controls the memory read address, the memory write address, and the time at which the read and write registers are loaded. Thus, the operations processor 716 provides controls signals including but not limited to load, clear and increment signals for each of the registers npu_wd 700, mem_ra 702, mem_wa 704, nwa_cmp 706, ipa_cm 708, npu_sm 710, nwa_cm 712 and NFA 714.

The operations processor 716 controls the various address and data registers and determines whether a memory read address or a memory write address is to be provided on mio_adr signal path 640i. The operations processor 716 is coupled to address mux 728 via a control signal line sel_mio_adr. Control line sel_mio_adr selects whether a read address, a write address or a search address is being provided at output port 640i as the address being provided to the address cache. Note that the memory read address mem_ra and memory write address mem_wa are here shown bussed together on one signal path coupled to address mux 728.

The operations processor 716 controls the increment and the load operations of the memory read address register mio_ra 702 and the memory write address register mio_wa 704. Similarly, the operations processor 716 controls the increment and decrement operations of the NFA registers 692, 714 and controls the updating of the NPU search math circuit npu_sm 710. That is, the operations processor performs a memory read operation, captures the data which is returned as a result of the read operations, examines the result of the comparison between the address being searched for and the address read and determines whether the read address is less than, equal to or greater than the searched for address.

The operations processor 716 examines the results provided thereto from the comparator 706 and determines whether the search address should be increased or decreased.

The operations processor also instructs the search math circuit npu_sm 716 to either do a down-branch or an up-branch operation when searching for the next address. The operations processor 716 receives the results from npu_sm 716 and provides the results to the search engine 634 (FIG. 16) via the address mux 728 so that another read cycle may be performed. These steps are repeated until the operations processor 716 locates the searched for address or exhausts the number of allowed iterations.

If the address read from the address cache is greater than the searched-for-address, the binary search is directed to addresses lower than the address read from the address cache. If the address read from the address cache is less than the searched-for-address, the binary search is directed to addresses higher than the address read from the address cache. Thus, the operations processor 716 determines how to the npu_sm 710 should be updated and updates the npu_sm 710 to generate the next address in the binary search.

That is, in addition to initiating memory read and write signals and selecting which address is going to be read or written via the sel_mio_adr signal line, the operations processor 716 effectively controls the binary search in the NPU.

In an embodiment where the address table is 128 K the maximum number of iterations is seventeen. It should be notes that only one search is here being done (vs. two concurrent searches being performed in the AMA search engine).

A memory read data register 690 captures age, tag, data and address information signals age_di, mem_enti_tag, mem_enti_dat, mem_enti_adr fed to respective ones of the NPU input ports 640a, 640b, 640c and 640e. Registered signals mem_enti_tag, mem_enti_net, mem_enti_dat and age_di, are fed from the output of register 690 to an I/O register file 694 and to a memory read/write register 724.

Addresses which are going to be removed, installed or otherwise read or written by the NPU 640 are stored in the I/O register file 694. In one embodiment, the register file 694 may be provided having a seventeen bit interface and thus addresses are coupled into the register file 694 seventeen bits at a time. Differences in bit width between the FPU software interface and the NPU can be accommodated by the register file 694 by adjusting the length of the register file 694. The register 694 provides signals to be written to an npu write data register 700.

The memory read/write register 724 receives data from two places. First the memory read/write register 724 receives the registered signals from the memory read register 690 (i.e. data that was read). Additionally the memory read/write register 724 receives data from the npu write data register 700 in which is stored data to be written to the address cache 630. In response to the received data, the memory read/write register 724 reads/writes data from/to the address cache memory 630 on output ports 640l–640o. Thus, all data going to/from the address cache memory 630 from/to the NPU 640 is provided from either the memory read register 690 or the npu write data register 700.

To read/write information from/to the address cache 630, the NPU 640 must generate the addresses at which information is being either read or written from/to the address cache memory 630. Thus memory read address register mem_ra 702 has stored therein the address to be read and memory write address register mem_wa 704 has stored therein the address where information is to be written.

The NPU 640 also includes a comparator 706 for comparing two addresses. The comparator should preferably be capable of comparing two addresses in a single operation. Thus, if for example the addresses are provided as forty-eight bit addresses, then comparator 706 is preferably provided as a forty-eight bit comparator.

The comparator 706 allows an install or remove to be done based on a particular network address value. It should be noted that in some embodiments the comparator 706 may be omitted from the NPU 640. In this case the search engine 634 must inform the NPU 640 of the address to be installed or removed in memory. Thus, in such an embodiment the NPU 640 is informed by the search engine 634 of the location in the address cache where the 48 bit network address to be installed or removed in memory.

In the circuit of FIG. 18, however, the comparator 706 searches out the location of the network address in the address cache 630. That is, the comparator performs a forty-eight bit comparison similar to the comparison done in the search engine 636. Thus, one input to NPU comparator 706 is an address from the address cache memory 630 and the other input is the address provided by the frame processor 40' to install or remove in the address cache 630. The address provided by the frame processor 40' is coupled to the comparator 706 through the register 724.

Thus, to perform an install operation, the NPU must first search for the address in the address cache 630 and not find the address in the address cache 630. Then as will be described below in conjunction with FIG. 19, a so-called shuffle operation is performed to provide a location within the address cache memory in which the entry may be installed.

Conversely, to perform a remove operation, the NPU must first search for the address in the address cache 630 and find the address in the address cache 630. Then the entry for that address is removed from the address caches 630 and a shuffle operation is performed to fill in the location from which the entry was removed from the address cache memory 630.

The NPU comparator 706 provides signals to the operations processor 716 indicate whether the address retrieved from the memory is less than, greater or equal to the address being searched for. Thus in response to the comparator output signals, the operations processor 716 generates a signal which causes a new address to be retrieved from the memory and fed to the comparator 706.

A second comparator 712 receives information from the operations processor 716 and indicates to the memory read register 702 when the install or remove operations are complete. As will be explained in detail below in conjunction with FIG. 19, when performing an install or a remove operation certain entries 631 (FIG. 16) in the address cache memory 630 (FIG. 15) must be copied in order to accomplish the remove or install operation. Thus the comparator 712 compares memory addresses read from the memory read address register 702 with the next free address of the address cache 630 provided by a next free address register 714 and provides a comparator output signal to the operations processor 716, and a search math circuit npu_sm 710 which maintains the begin point, midpoint and end point values during binary searches on behalf of the frame processor as well as comparing the memory read and memory write addresses against other registers (next free, upper bound for either network side or IP side) to signal the OPS processor when an install or remove shuffle is complete.

Since the NPU 640 performs all of the install and remove operations, the NPU 640 recognizes whether or not the address cache 630 is full. Entries are made in the address cache 630 in the following manner. When the AMA initially begins operation, there are no entries in the address cache. Thus, the next free address is zero. As address entries 631 are stored in the address cache 630 (i.e. installed in the address cache 630) the value of the next free address (NFA) register 714 is incremented. Similarly, as addresses are removed from the address cache 630, the value store in the NFA register 714 is decremented. The NFA register 714 is coupled to the operations processor 716 and sends and receives control signals to increment and decrement the register value and also sends signals which indicate whether the network address table 630 is full or empty. The NFA register 714 is also coupled to the PIO 726 and provides to frame processor 40' via the PIO 726 signals which indicate whether the network address table 630 is full or empty. Thus, if the network table can accommodate 8 K entries, then the NFA register holds a value of zero when the network table is empty and the NFA register holds a value of 1FFF (hexadecimal) when the network table is full.

The signal cam_top indicates the address which is presently at the top of the memory address cache 630. The next free address is always one address greater than the address defined by the signal cam_top. The cam_top signal is fed from NPU output terminal 640j to the search engine 634. The NPU 640 provides the NFA to the search engine 636 since the search engine 636 must know where the top of the address cache is in order to determine the initial midpoint address in performing the binary search algorithm.

The memory read address registers and memory write address registers 702, 704 are the two registers where memory addresses are stored when the NPU 640 is copying memory locations to accomplish an install or a remove operation. The addresses are in two different registers 702, 704 since addresses being read are read from the read address register 702 and addresses being written are written to the write address register 704.

As mentioned above in conjunction with FIG. 16, prior to performing a read or write operation at an address specified by mio_adr, the NPU 640 sends signals a request signal mio_req on line 640p. In FIG. 18 line 640p is shown to include three signal lines and the mio_req signal is shown to include the signals mio_wr, mio_wr_age and mio_req which are sent to the master 676 to indicate to the master 676 that the NPU 640 is ready to perform a read or a write operation. The signal mio_wr indicate whether the NPU request is for a read or a write operation. The signal mio_wr_age is separate from the signal mio_wr so that the age bit may be modified on behalf of the frame processor without affecting the other values in that particular location in the address cache. For example, the age bit may be cleared without affecting the other values in that particular location of the address cache. Signal mio_req is a request for memory access. In response to the request, the master issues an acknowledgement signal mio_ack to the NPU 640 indicating whether the NPU is given access to the memory.

Referring briefly to FIG. 18a, the network address cache 630 is shown partitioned or subdivided into two portions 630a, 630b. The first portion of the network address cache 630a has stored therein a first set of address entries which may for example correspond to network addresses. The second portion of the network address cache 630b has stored therein a second set of address entries unrelated to the network addresses. The second portion of the network table 630b may contain, for example, address information which may be utilized by a router. For example, the second portion of the address cache 630b may have stored therein a plurality of Internet protocol (IP) addresses.

In this example, the network address portion of the network table 630a is utilized by the BMA 22' and AMA 32' to perform bridging operations while the IP address portion of the network table 630b is used by frame processor software to support routing operations rather than the bridging operations conducted by the BMA 22' and AMA 32'.

That is, the IP address portion of the network table 630b allows the internetworking device to cooperate with a router (not shown). The router must support each protocol on the bridge. Thus to support the router, the address cache memory 630 is partitioned. In operation when a router is involved, the IP address can be found in the second portion 630b of the address cache memory 630.

In order to partition the address cache memory, the AMA 32' must include at least one bounds register for each of the partitions in the address cache 630. As already mentioned above in conjunction with FIG. 18, the NPU includes three bounds registers nw_upper_bound, ip_lower_bound and ip_upper_bound. The lower boundary for the network table is presumed to be zero and thus a separate bounds register is not required for this value. The bounds registers are written by the frame processor. Thus, as shown in FIG. 18 the bounds registers reside within the PIO and are coupled to the NPU search math circuit npu_sm 710.

The upper bound address of the network table nw_upper_bound is also fed to the search engine math units 672, 672' (FIG. 17) along line 635. Thus in those AMA embodiments which include a network table partitioned into two memory regions, the network table upper bound address is fed to the math units 672, 672'.

The bounds registers indicate the boundaries between the two halves 630a, 630b of the address cache memory 630. The bounds registers can be set to allow the entire address cache 630 to store either network addresses or IP addresses. Thus, in an application where no routers are coupled to the system, the bounds registers can be set to allow network addresses to be stored throughout the entire address cache memory 630 for use by the BMA 22'.

In one embodiment the address cache memory 630 may be selected having a storage capacity to accommodate 128 k entries of 100 bits each. In this case, the bounds registers may be set to partition the address cache memory 630 into portions 630a, 630b with each memory portion able to accept 64 K entries of 100 bits each. It should be noted and as mentioned above the bounds registers may also be set to provide each portion of the address cache 630a, 630b having variable lengths to accommodate particular needs of either the BMA 22' or the router.

Referring again to FIG. 18, in the case where the address cache 630 is partitioned into two portions as describe above in conjunction with FIG. 18a, the NPU 640 should preferably include a second next free address register 692 and a second comparator 708. In this case, the next free address register 692 has stored therein the next free address for the second portion 603b (FIG. 18a) of the address cache 630 while the next free address register 714 has stored therein the next free address in the address cache portion 630a (FIG. 18a).

Thus when an address is added to the address cache 630a the value of register 714 is incremented and when an address is removed from the first portion of the address cache 630a, the value in register 714 is decremented. Likewise, when an address is added to the address cache 630b the value stored register 692 is incremented and when an address is removed from the second portion of the address cache 630b, the value in register 692 is decremented. With this particular arrangement, both router and bridge addresses can be searched in the address cache 630.

An address multiplexor 728 selects between first and second modes (e.g. network and IP) in which memory addresses mio_adr are provided to the address cache memory 630.

Referring now to FIG. 19, the steps performed in removing information stored at memory address 6 of a network table will be explained. It should be noted that the steps to remove the contents of an entry are accomplished by the hardware described above in conjunction with FIG. 15–18.

In this particular example, the network table has stored therein sixteen network addresses in memory address positions 0–15 of the network address table. It should be noted that the entries 631 in the address cache 630 have been placed in a linearly ascending order according to network address values.

To accomplish a remove operation, the contents of memory address position 7 (i.e address 15) are copied to the contents of memory address position 6. Next, the contents of position 8 (i.e. address 17) are copied from position 8 to position 7 of the network address table. Next, the contents of position 9 (i.e. address 19) are copied from position 9 to position 8. This process is repeated until the all of the addresses above position 6 in the network address table have been copied up one position. This technique is generally referred to as shuffling. After the contents of all of the memory locations between positions seven and fifteen have been copied and essentially moved up one position in the address cache 630 the next address indicator NFA is updated to move from 16 to 15.

Thus, removing an out-of-date network address from the network address table first requires the frame processor 40' to determine the current position of the address to be removed in the linear list of addresses. Once accomplished, the frame processor 40' commands the AMA 32' to remove the address from its current position in the network address table. The AMA consequently performs the above-described shuffle-up operation thereby shifting all active entries in the table starting one beyond the specified remove position up by one position in the network address table. The shuffle-up fills in the open slot in the network address table created by the address removal.

Assuming next it is desirable to install an address, for example, it is desirable to install an address at memory address position 6 of the network address table, an opening in the table must first be made to accommodate the new entry. Thus, the first step to be taken is that the last entry (i.e. position 15) is moved to the next free address position.

Assuming the last entry of the network address table is at position fifteen, then the next free address will be sixteen. Thus, the information is moved from location fifteen to location sixteen of the network address table and the NFA is updated to seventeen.

When performing an install, the AMA 32' must interact with the network interface and perform an interlock to insure that the NFA can be safely changed from fifteen to sixteen. This is because the midpoint value cannot be changed during a search since that would ruin or prevent the search from being properly accomplished. There is no need to have an interlock during a remove operation because during a remove operation one value only is copied. During a remove operation, the next free address does not need to be changed until the end of the shuffle. During an install however, the next free address has to be changed at the beginning of the shuffle potentially disrupting the initial midpoint calculation at the start of the binary search.

It should thus be noted that when a search is being done to determine whether a destination address or a source address are contained in the network table 630, the search must be capable of taking place between the BMA 22' and the AMA 32' at any time. If the search is performed using a binary search algorithm, then the linear order of the address cache must be preserved at all times during the search.

Once all the entries in the table 630 are pushed down one location, the 48 bit address is copied into the new memory location which has been made available.

Thus, inserting a new network address into the network address table requires the frame processor 40' to first determine where in the linear list of addresses the new address belongs. Having accomplished this, the frame processor 40' then commands the AMA 32' to insert the new address in its proper position in the network address table. The AMA 32' consequently performs the above-described shuffle-down operation, shifting all active entries in the network address table starting at the specified insert position down one position in the network address table. The shuffle-down thereby creates an available slot in the network address table into which the new address is then inserted.

If the network table is full, the software must remove an address prior to installing an address. The last address entry in the network table is never used, thus a next free address value corresponding to last position of the network address table indicates that the table is full. The system will not install an address if the table 630 is full nor will the system remove an address if the table 630 is empty.

As graphically illustrated in FIG. 20, each system cycle begins with a source address (SA) read operation which is followed by an SA compare operation. The SA read and SA compare steps are performed alternatively for a predetermined number of system cycles until either a source address is found or a source address is not found in the address cable 630. If the desired source address is located in the address cache 630 then the age bit is set during an SA age cycle. If the desired source address is not located in the table after a predetermined number of system cycles have passed, the SA age cycle does not occur and the age bit is not set. In a similar manner, a destination address search is carried out via alternating DA read and DA compare operations as shown.

Since the memory is not accessed during an SA compare step, a DA read which does access memory can be performed while the SA compare is being done. Similarly, since the memory is not accessed during a DA compare step an SA read can be performed while the DA compare is being done. Thus as shown in FIG. 20 the SA read and DA read steps are interleaved. Thus, with this technique it is possible to have a memory read performed during every memory cycle.

It is beneficial to begin a search cycle with an SA read since if the address is found during the SA compare step then the age bit must be set on the next cycle. That is, once the source address is found on the SA compare cycle, an additional system cycle corresponding to an SA age cycle must be performed to set the age bit. Thus, as shown in FIG. 20 by beginning with an SA read the overall cycle time can be maintained to a predetermined number of system cycles.

It is possible of course to interleave memory I/O cycles irrespective of whether the source address finishes first or the destination address finishes first. That is, memory read cycles can be interleaved with either the source address search or the destination address search.

For example, one can guarantee that the search results will be returned within twenty-seven system cycles by limiting the search for a search address to a maximum of thirteen SA read operations and thirteen SA compare operations which is a total of twenty-six system cycles. The twenty-seventh system cycle results from the above described SA age cycle. Since the destination address search begins one cycle after the source address search and since the age bit cycle is appended to the end of the last SA compare step, the maximum interval is not stretched beyond the twenty-seven cycle time frame.

In one embodiment, the memories operate on a 30 nanosecond (nsec) cycle time. The system cycle time corresponds to 40 nanoseconds. Thus, only one search can be accomplished every system cycle.

To allow the AMA 32' to filter at a rate of about 950 kilo-packet per second (KPPS) the above described interleaved memory access scheme is used. That is, to achieve a 950 KPPS filtering time, the source address and destination address read operations SA read and DA read are interleaved.

It will be appreciated of course that the selection of system and memory cycle times is arbitrary and limited by the technology limits of the devices. For example, in some embodiments a system may be provided having a twenty nsec cycle time and the address memory cache 630 may be provided having a fifteen nsec cycle time. In this case it would still be advantageous to interleave the SA and DA searches.

If it were possible to perform a read and compare operation within a single system clock cycle, then it would not be necessary to use this interleaving technique. However, whenever it is not possible to perform a read and compare operation in a single system clock cycle then it may be advantageous to use the above described interleaving technique since this interleaving technique increases the speed with which the SA and DA searches are completed. Moreover, by folding in the read and compare operations of the SA and DA searches in the AMA 32' both the memory 630 and the AMA are performing tasks during each system cycle. Thus the AMA 32' receives data from the address cache memory 630 and provides data to the address memory cache 630 on every system cycle.

Referring now to FIG. 21, it is now apparent that after a source address is located and an SA age cycle is implemented to thus indicate that the search for the source address is complete, it is no longer necessary to perform the SA read and SA compare operations. However, the search for the destination address continues and thus DA read and DA compare operations continue to be executed. Thus, this results in system cycles in which no memory accesses are performed.

However, rather than allow a system cycle to pass in which no memory access is performed, as shown in FIG. 21, a memory I/O read or write operation can be performed during these otherwise unused system cycles. The master 674 (FIG. 17) allows memory read and/or write operations to be performed during such system cycles.

For example, an install or remove operation can be performed in these otherwise unused system cycles during which either a source address or destination address read operation would otherwise be performed. It should thus be appreciated that every system cycle may include an operation which requires a memory access. Thus, as shown in FIG. 21 installs and removes can take place when one of the searches finishes early.

It should be noted that although the maximum time spent searching is limited to a predetermined number of system cycles, the actual search time depends of course on the size of the address cache memory (i.e. whether the memory is provided as an 8 K memory, or a 128 K memory, etc . . . ) as well as the number of entries in the address cache memory.

Having described preferred embodiments of the invention, it will be apparent to those of ordinary skill in the art that other embodiments incorporating the inventive concepts may be employed. Accordingly, these embodiments should be viewed as exemplary and the invention should be limited only by the scope and spirit of the appended claims.

what is claimed is:

1. An internetworking device comprising:

a buffer management circuit for providing addresses;

a memory having a plurality of addresses stored therein; and an address management circuit, coupled to said buffer management circuit and said memory, said address management circuit for receiving addresses from said buffer management circuit and for searching addresses in said memory, wherein said address management circuit includes:

a search engine having first and second search circuits for simultaneously searching for first and second addresses in said memory; and a network processor unit coupled to said search engine for accessing said memory and for providing an indication of a last address stored in said memory to said search engine, wherein each of said first and second search circuits of said search engine comprise:

a comparator having a first input terminal coupled to receive an address from said buffer management circuit and a second input terminal coupled to receive an address retrieved from said memory, wherein said comparator compares a first address received from said buffer management circuit and a second address received from said memory and provides an output indication thereof; and a math unit, coupled to said comparator, said math unit for searching said memory and for identifying a next address to be provided to the second terminal of said comparator from said memory.

2. The internetworking device of claim 1, further comprising a state machine coupled between said comparator and said math unit, said state machine for receiving said output indication from said comparator and for providing an output signal to said math unit, wherein said output signal indicates to said math unit whether the second address has a value greater than, less than or equal to the first address.

3. The internetworking device of claim 1, wherein said first and second search circuits each perform a binary search.

4. The internetworking device of claim 3, wherein said math unit has stored therein a first value corresponding to a beginning address in said memory, a second value corresponding to an ending address in said memory, and a third value corresponding to an address between the beginning and ending addresses in said memory.

5. The internetworking device of claim 4, wherein the third value corresponding to an address between the beginning and ending addresses corresponds to a midpoint address between the beginning and ending addresses.

6. The internetworking device of claim 1, wherein said network processor unit comprises a register for storing an address that is indicative of a next free address in said memory, wherein the address corresponds to the indication provided from said network processor unit to said search engine.

7. The internetworking device of claim 6, wherein said network processor unit comprises an operations processor for installing addresses in said memory.

8. The internetworking device of claim 6, wherein said network processor unit comprises an operations processor for removing addresses from said memory.

9. The internetworking device of claim 6, further comprising:

a first bounds register; and a second bounds register, wherein said memory is provided having a first region defined by an address stored in said first bounds register and said memory is provided having a second region defined by an address stored in said second bounds register.

10. The internetworking device of claim 9, wherein said network processor unit further comprises:

a first register for providing a next free address of the first region of said memory; and a second register for providing a next free address of the second region of said memory.

11. The internetworking device of claim 10, wherein said network processor unit comprises an address multiplexor for indicating whether a first one of an install or a remove operation is being performed in a first one of the first and second regions of said memory.

12. A method for installing an address in a network address table stored in a memory of an internetworking device comprising the steps of:

(a) determining where in a linear list of address entries in the network address table a new address entry belongs;

(b) moving a last address entry in the network address table from its present position in the network address table to a position corresponding to a next free address entry position in the network address table;

(c) moving an address entry located previous to the last address entry in the network address table from its present position in the network address table to a new position in the network address table, wherein the new position is one position closer to the next free address entry position than the present position;

(d) repeating step (c) until all of the address entries above the new address entry in the network address table have been moved to create an available slot in the network address table; and (e) inserting the new address entry into the available slot in the network address table.

13. The method of claim 12, further comprising the step of informing a network processor unit that the install operation is complete.

14. A method for removing an address in a network address table stored in a memory of an internetworking device comprising the steps of:

(a) determining where in a linear list of address entries in the network address table an old address entry resides;

(b) moving an address entry located subsequent to the old address entry in the network address table from its present position in the network address table to the position of the old address entry in the network address table;

(c) moving an address entry located subsequent to the last moved address entry in the network address table from its present position in the network address table to a new position in the network address table, wherein the new position is the former position of the last moved address entry in the network address table; and

43

(d) repeating step (c) until all of the address entries above the old address entry in the network address table have been moved to fill in the open slot in the network address table created by the removed old address entry.

15. The method of claim 14, further comprising the step of informing a network processor unit that the remove operation is complete.

16. The method of claim 14, wherein said step of moving an address entry located subsequent to the old address entry in the network address table from its present position in the network address table to the position of the old address entry in the network address table comprises overwriting the old address entry with the address entry located subsequent to the old address entry in the network address table.

17. The method of claim 14, wherein said step of moving an address entry located subsequent to the last moved address entry in the network address table from its present position in the network address table to a new position in the network address table comprises overwriting the last moved address entry with the address entry located subsequent to the last moved address entry in the network address table.

18. An address management circuit having a network address table coupled thereto, said address management circuit comprising:

a search engine for receiving a source address and a destination address and for simultaneously searching the network address table for the source and destination addresses; and a network processor unit coupled to said search engine for accessing the network address table and for providing a next free address indicator of the network address table to said search engine, wherein said search engine includes a pair of search circuits, each of said search circuits comprising:

a comparator having a first input terminal coupled to receive a first one of a source address and a destination address and a second terminal adapted to receive an address retrieved from said network address table, wherein said comparator compares the first one of the source address and the destination address and the address retrieved from said network address table; and

44 a math unit, coupled to said comparator, said math unit for searching said network address table and for identifying a next address to be provided from said network address table to the second terminal of said comparator.

19. The address management circuit of claim 18, wherein said network processor unit comprises:

a comparator for comparing first and second addresses fed thereto and for providing an output indication thereof; and a state machine, coupled to said comparator, for receiving said output indication from said comparator, wherein said state machine installs and removes addresses from the network address table.

20. A method for searching a memory of an internetworking device to find an active address, said method comprising steps of:

retrieving a first address from a network address table;

comparing a particular source address with the first address retrieved from the network address table; and retrieving a second address from the network address table while simultaneously performing the step of comparing the particular source address with the first address retrieved from the network address table, comparing a particular destination address with the second address retrieved from the network address table;

simultaneously retrieving a third address from the network address table; and performing an age cycle after said particular source address is matched with an address retrieved from the network address table.

21. The method of claim 20, wherein after executing an age cycle no more retrieve steps for said particular source address are performed.

22. The method of claim 20, wherein after a source address compare step indicates that a source address is found, then performing a memory input-output read step in place of a source address retrieve step.

* * * * *